US009648627B2

(12) United States Patent
Tinnakornsrisuphap et al.

(10) Patent No.: US 9,648,627 B2
(45) Date of Patent: May 9, 2017

(54) BEACON TIMESLOT ALLOCATION

(75) Inventors: Peerapol Tinnakornsrisuphap, San Diego, CA (US); Vijay Raman, Salt Lake City, UT (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/619,693

(22) Filed: Sep. 14, 2012

(65) Prior Publication Data

US 2014/0080491 A1    Mar. 20, 2014

(51) Int. Cl.
| H04W 4/00 | (2009.01) |
| H04W 72/08 | (2009.01) |
| H04W 24/02 | (2009.01) |
| H04W 16/10 | (2009.01) |
| H04W 84/04 | (2009.01) |
| H04W 48/12 | (2009.01) |

(52) U.S. Cl.
CPC ......... H04W 72/082 (2013.01); H04W 16/10 (2013.01); H04W 24/02 (2013.01); H04W 48/12 (2013.01); H04W 84/045 (2013.01)

(58) Field of Classification Search
CPC ............. H04W 72/0446; H04W 88/08; H04W 72/0453; H04W 36/30; H04W 84/12; H04W 80/04; H04W 88/06; H04W 84/18; H04L 2012/5608
USPC ............. 370/310.2, 328, 330, 338, 349, 332
See application file for complete search history.

(56) References Cited

U.S. PATENT DOCUMENTS

| 5,606,727 A * | 2/1997 | Ueda ............................ 455/513 |
| 7,304,967 B2 | 12/2007 | Kakura |
| 7,450,553 B2 | 11/2008 | Park et al. |
| 7,826,343 B2 | 11/2010 | Krasner |
| 7,844,289 B2 * | 11/2010 | Bykovnikov .................. 455/502 |
| 8,023,552 B2 * | 9/2011 | Balachandran ........ H04B 1/715 375/133 |
| 8,260,207 B2 * | 9/2012 | Srinivasan et al. .......... 455/63.1 |
| 2005/0128991 A1 | 6/2005 | Dayanandan et al. |
| 2008/0159217 A1 * | 7/2008 | Chang ............... H04W 72/0406 370/329 |

(Continued)

FOREIGN PATENT DOCUMENTS

WO    WO-2012075052 A1    6/2012

OTHER PUBLICATIONS

Hatoum A., et al., "Q-FCRA: QoS-based OFDMA Femtocell resource Allocation Algorithm", Communications (ICC), 2012 IEEE International Conference on, IEEE, Jun. 10, 2012, pp. 5151-5156, XP032274067, DOI: 10.1109/ICC.2012.6364241 ISBN: 978-1-4577-2052-9 p. 5153, col. 2.

(Continued)

*Primary Examiner* — Brenda H Pham
(74) *Attorney, Agent, or Firm* — Joseph Hanasz

(57) ABSTRACT

Beacon transmissions by access points (e.g., femtocells) are controlled in an attempt to increase the number of beacons seen by the access terminals in the vicinity of the access points. In some aspects, interference between beacons is reduced by, for example, scheduling beacon transmissions of neighboring access points at different times. In some aspects, beacon transmissions are scheduled in a manner (e.g., allocated in substantially contiguous timeslots and/or allocated to different frequencies) that enables access terminals to acquire all relevant beacons in a relatively short time frame.

50 Claims, 18 Drawing Sheets

(56) References Cited

U.S. PATENT DOCUMENTS

| | | | |
|---|---|---|---|
| 2008/0261623 A1 | 10/2008 | Etemad et al. | |
| 2008/0298275 A1* | 12/2008 | De Sousa | H04W 16/18 370/255 |
| 2009/0203386 A1 | 8/2009 | Edge et al. | |
| 2011/0310858 A1* | 12/2011 | Tokgoz et al. | 370/336 |
| 2012/0258720 A1* | 10/2012 | Tinnakornsrisuphap et al. | 455/442 |
| 2012/0329456 A1* | 12/2012 | Makh et al. | 455/435.1 |

OTHER PUBLICATIONS

International Search Report and Written Opinion—PCT/US2013/059825—ISA/EPO—Feb. 28, 2014.

* cited by examiner

|   | A | B | C | D |
|---|---|---|---|---|
| | 1,5 | 3 | 2,6 | 4 |

FIG. 6

|   | A | B | C | D |
|---|---|---|---|---|
| A | 1.000 | 0.546 | -0.235 | 0.076 |
| B | 0.546 | 1.000 | -0.123 | -0.450 |
| C | -0.235 | -0.123 | 1.000 | 0.321 |
| D | 0.076 | -0.450 | 0.321 | 1.000 |

FIG. 7

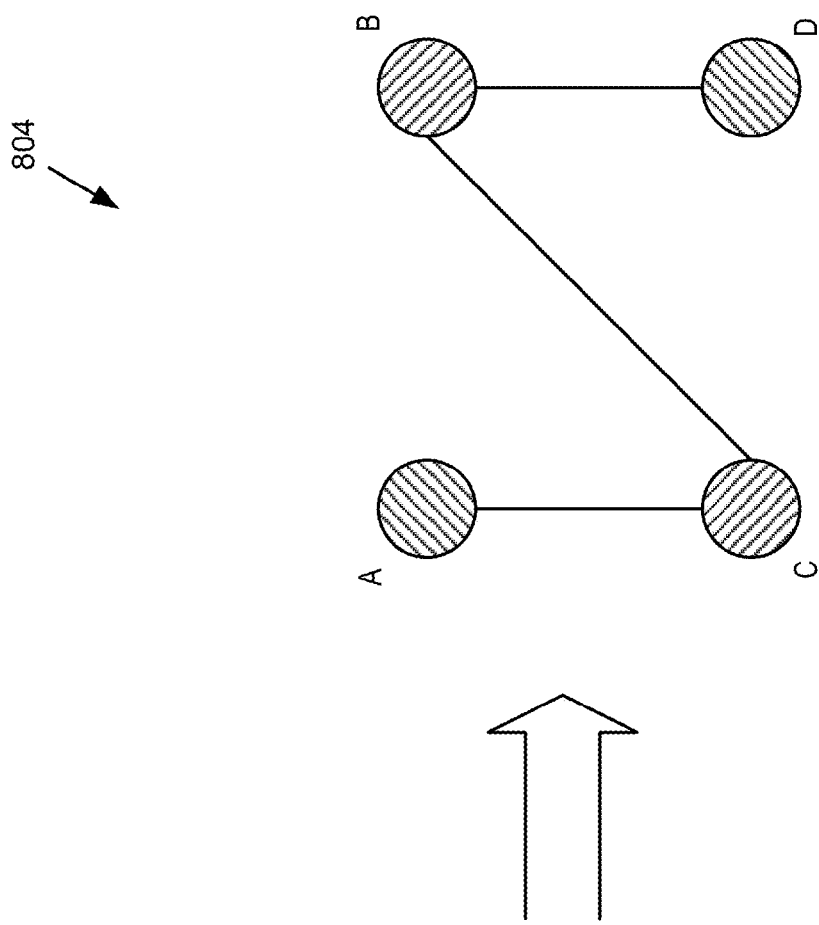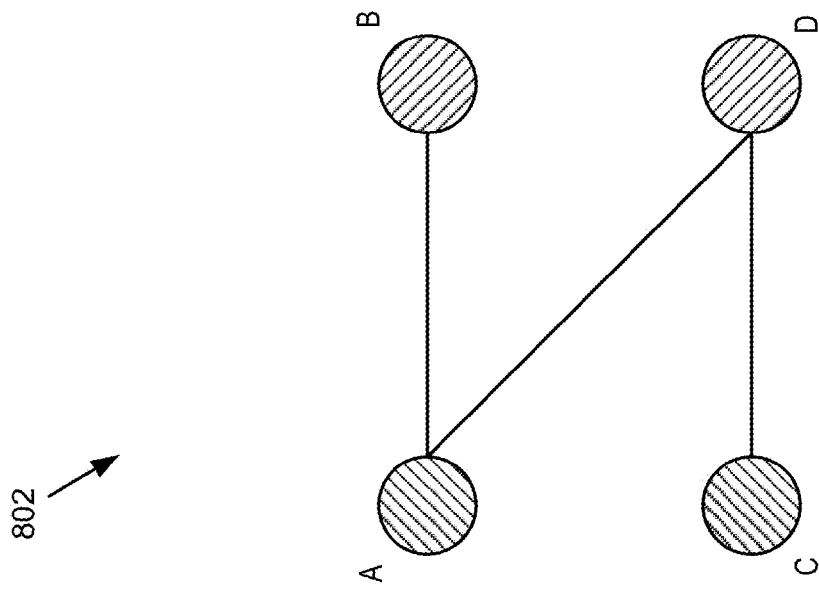
FIG. 8

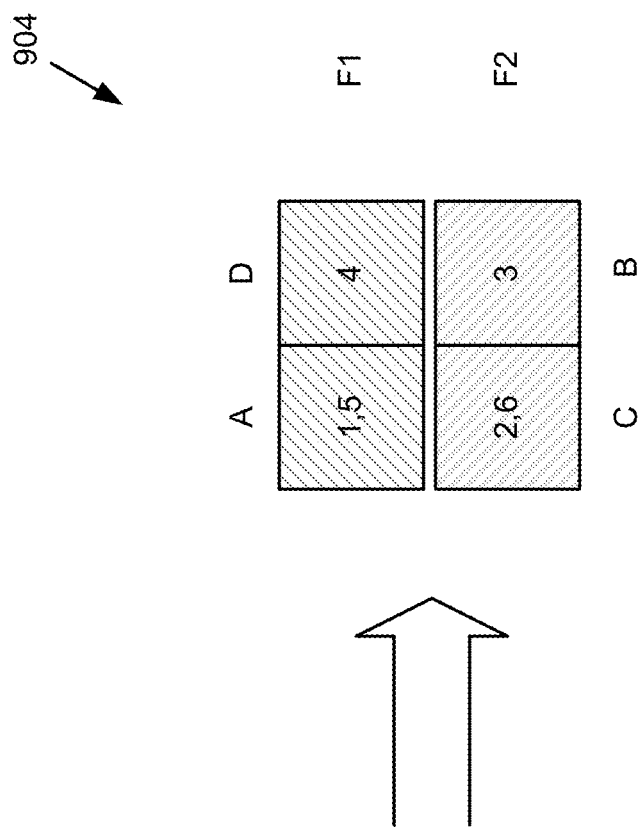
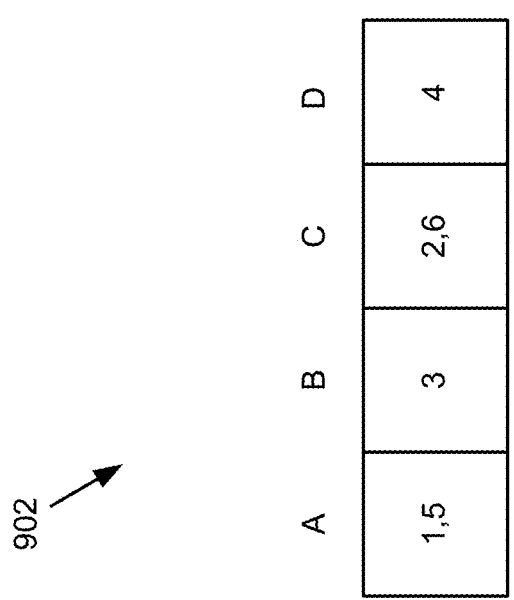
FIG. 9

BEACON TIMESLOT ALLOCATION

BACKGROUND

Field

This application relates generally to wireless communication and more specifically, but not exclusively, to allocating timeslots, and optionally radio frequencies, for the transmission of beacons.

Introduction

A wireless communication network may be deployed over a defined geographical area to provide various types of services (e.g., voice, data, multimedia services, etc.) to users within that geographical area. In a typical implementation, macro access points (e.g., that provide coverage via one or more macro cells) are distributed throughout a network to provide wireless connectivity for access terminals (e.g., cell phones, portable devices, etc.) that are operating within the geographical area served by the network.

As the demand for high-rate and multimedia data services rapidly grows, there lies a challenge to implement efficient and robust communication systems with enhanced performance. To supplement conventional network access points (e.g., macro access points), small-coverage access points (e.g., with transmit power of 20 dBm or less) may be deployed to provide more robust coverage for access terminals. For example, a small-coverage access point installed in a user's home or in an enterprise environment (e.g., commercial buildings) may provide voice and high speed data service for access terminals supporting cellular radio communication (e.g. CDMA, WCDMA, UMTS, LTE, etc.).

Conventionally, small-coverage access points may be referred to as, for example, femtocells, femto access points, home NodeBs, home eNodeBs, or access point base stations. Typically, such small-coverage access points are connected to the Internet and the mobile operator's network via a DSL router or a cable modem. For convenience, small-coverage access points may be referred to as femtocells or femto access points in the discussion that follows.

Applications running on an access terminal may make use of the location (e.g., position) of the access terminal. For example, the location of an access terminal may be reported during a 911 call by the access terminal. As another example, an access terminal-based navigation system uses the current location of the access terminal for providing navigational aids.

The location of an access terminal may be determined relative to a set of access points, whose locations are known. Two techniques for determining the location of an access terminal include a time-based approach and signal strength-based triangulation.

The time-based approach relies on estimating the distance between two communication points by estimating the difference in the signal propagation delay between them. The accuracy of the time-based approach is limited, however, by signal propagation characteristics that tend to be location dependent (due to multipath effects and lack of a line of sight component). Furthermore, the resolution in a time-based approach depends on the chip duration over which a propagation delay change can be observed (which can be about 40 meters).

In a signal strength-based triangulation method, an access terminal may measure the pathloss between a set of access points and itself. The pathloss values are used for estimating the distance between each access point and the access terminal. For example, a pathloss fingerprint corresponding to the set of path loss values is compared with a previously defined database of pathloss fingerprints (each of which corresponds to a particular location) to determine the current location of the access terminal. The accuracy in estimating the location improves with the number of distinct access points from which the pathloss values are calculated. The database of pathloss values can be generated by either developing mathematical models and simulating them or by using technician walks. The simulation-based approach may be more suitable for a large enterprise setup, while technician walks may be used to correct any errors in the modeling.

In the case of signal strength-based triangulation, the pathloss values may be calculated from Ecp/Io and the Io values of beacons transmitted by the access point as measured and reported by the access terminal to its serving access point. Here, Ecp is the received signal strength of a beacon at the access terminal and Io is the total received energy at the access terminal including noise. The ratio Ecp/Io is therefore the received signal to interference-plus-noise ratio (SINR) of the beacon at the access terminal. The serving access point can calculate the pathloss between access terminal and the access points that transmitted the beacons using knowledge of the transmit powers of the access points. In cdma2000, the access terminal (i.e., a mobile station) can use the pilot strength measurement message (PSMM) reports for sending the signal strength values measured on the femtocell frequencies, and the candidate frequency search (CFS) messages for signal strength values measured on macro frequencies.

To measure and report beacon signal strength, the SINR of the signal at the access terminal should be higher than a detection threshold (e.g., −16 dB). When an access terminal is close to its serving access point, the interference from the serving access point may overwhelm the beacons received from the non-serving access points, thereby degenerating the triangulation set to just one. While this can be mitigated to some extent by having a separate beacon channel, beacons from multiple access points may still overlap, making it difficult for the access terminal to decode them and measure their strengths individually. This can affect the accuracy of the location fix. Consequently, a need exists for more effective techniques for determining the location of an access terminal.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to controlling beacon transmissions by access points (e.g., femtocells) in a manner that attempts to maximize the number of beacons seen by the access terminals in the vicinity of the access points. In some aspects, this may be achieved by reducing interference between beacons (e.g., by scheduling beacon transmissions of neighboring access points at different times). The disclosure also relates in some aspects to scheduling beacon transmissions in a manner that facilitates the acquisition of all relevant beacons by an access terminal in a relatively short time frame (e.g., by scheduling beacon transmissions on substantially concurrent timeslots and/or scheduling beacon transmissions on different radio frequencies).

In some implementations, a beacon scheduling scheme schedules beacon transmissions by potentially interfering neighboring access points so that the transmissions do not overlap in time. For example, potential interfering neighbors may be identified through network listen module (NLM) measurements (e.g., a first access point may be deemed to interfere with a second access point if the second access point can hear the first access point). Once the interfering neighbors of an access point are determined, the scheduling scheme allocates timeslots to these access points so that the access point and its interfering neighbors do not transmit beacons during the same timeslot. In some implementations, to facilitate more efficient allocation of timeslots, the scheduling algorithm orders the access points by decreasing order of the number of interfering neighbors, and then allocates timeslots based on the ordering.

In some implementations, a beacon scheduling scheme schedules beacon transmissions on both frequency and time. This scheme may take into account that for a given timeslot, an access terminal may hear different beacons when the access terminal is at different locations. That is, beacons from far away access points may be irrelevant for an access terminal. Thus, searching for such beacons may needlessly impact the access terminal's beacon search procedure.

Consequently, a beacon scheduling scheme in accordance with the teachings herein may be used to determine which access terminal locations receive beacons from which access points. A cross correlation can then be performed between every pair of timeslots to determine the likelihood, for each location, of receiving beacons from different timeslots. If there is a sufficiently high correlation between timeslots, the scheduling is adjusted so that the associated beacons are scheduled on substantially contiguous (i.e., contiguous or nearly contiguous) timeslots. In this way, a given access terminal will be able to more readily (e.g., quickly) acquire all of the beacons of interest to that access terminal In addition, such a beacon scheduling scheme may assign beacon transmissions that are on the same timeslot to different frequencies. In this way, by hopping between frequencies when searching for beacons, an access terminal may more readily (e.g., quickly) acquire all of the beacons of interest.

In some implementations, beacons used for determining a location of an access terminal or other entity (e.g., referred to as location beacons) are scheduled to avoid interference with reselection beacons. For example, an access point may be configured to periodically transmit a location beacon instead of a reselection beacon on one or more beacon frequencies.

In view of the above, in some aspects, wireless communication in accordance with the teachings herein involves: identifying, for each access point of a set of access points, any other access points of the set that potentially interfere with the access point, wherein the identification is based on signals received at the access point; allocating timeslots and radio frequencies for beacon transmissions by the access points of the set based on the identification of the potentially interfering access points; and sending at least one message indicative of the allocation to at least one of the access points of the set.

In addition, in some aspects, wireless communication in accordance with the teachings herein involves: identifying, for each access point of a set of access points, any other access points of the set that potentially interfere with the access point; ordering the access points of the set based on how many potentially interfering access points are identified for each of the access points; allocating timeslots for beacon transmissions by each of the access points of the set, wherein the allocation is performed according to the ordering of the access points; and sending at least one message indicative of the allocation to at least one of the access points of the set.

BRIEF DESCRIPTION OF THE DRAWINGS

These and other sample aspects of the disclosure will be described in the detailed description and the claims that follow, and in the accompanying drawings, wherein:

FIG. 6 is a simplified diagram illustrating an example of beacon allocation in timeslots;

FIG. 7 is a simplified diagram illustrating an example of a correlation matrix;

FIG. 8 is a simplified diagram illustrating an example of inverting a timeslot allocation to provide a frequency allocation;

FIG. 9 is a simplified diagram illustrating an example of beacon allocation in frequency and time;

Figure 1:
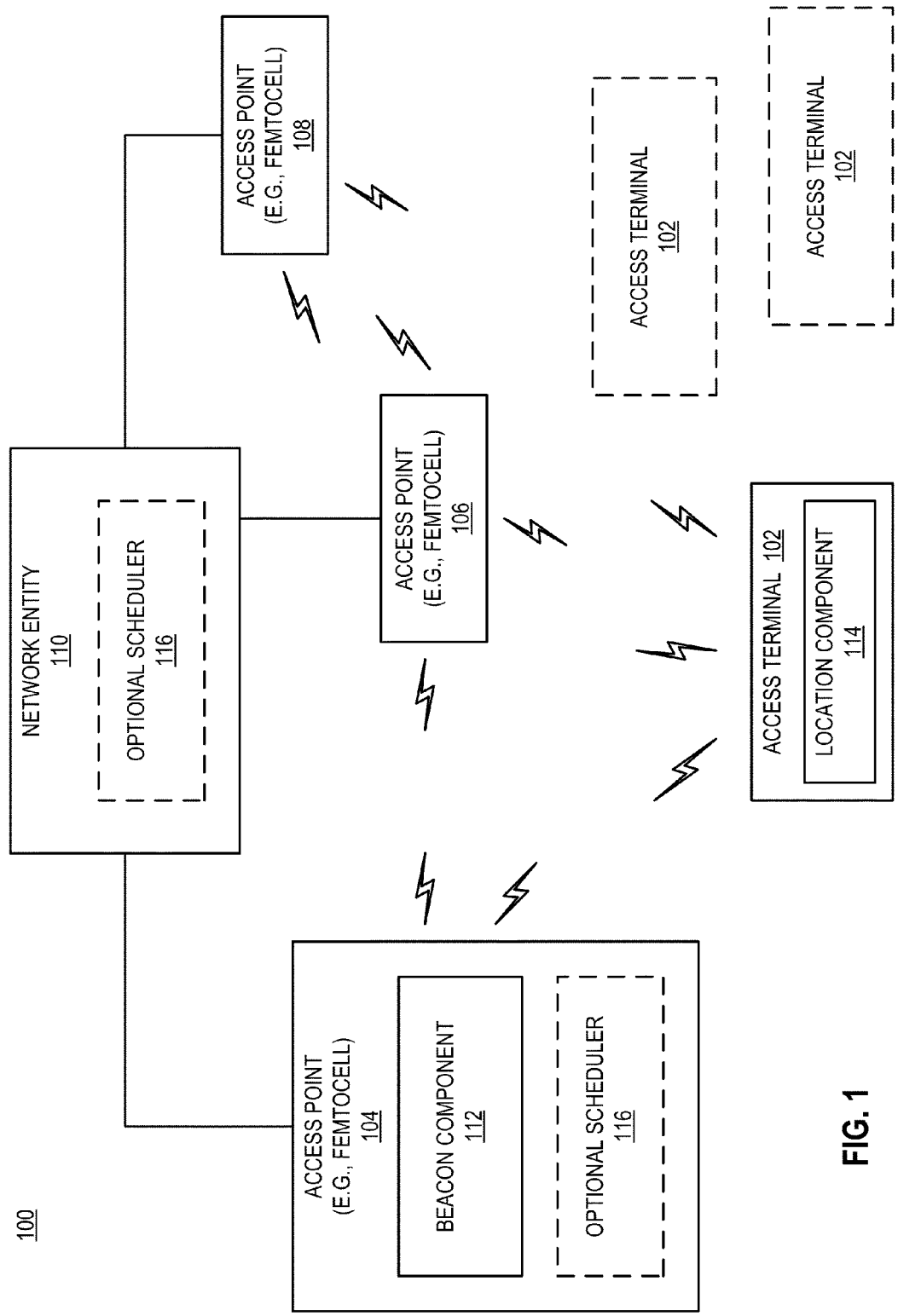
FIG. 1 is a simplified block diagram of several sample aspects of a communication system where the location of an access terminal is determined based on beacons transmitted by access points.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, femtocells, Home NodeBs, Home eNodeBs, and so on, while access terminals may be referred to or implemented as user equipment (UEs), mobile stations, and so on.

Access points in the system 100 provide access to one or more services (e.g., network connectivity) for one or more wireless terminals (e.g., an access terminal 102) that may be installed within or that may roam throughout a coverage area of the system 100. For example, at various points in time the access terminal 102 may communicate with (e.g., receive signals from) an access point 104, an access point 106, an access point 108, and other access points in the system 100 (not shown). Each of these access points may communicate with one or more network entities (represented, for convenience, by a network entity 110) to facilitate wide area network connectivity.

The network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals; controlling paging for access terminals; and providing access control for access terminals. Also, two or more of these network entities may be co-located and/or two or more of these network entities may be distributed throughout a network.

A beacon scheduling scheme as taught herein is used to control the transmission of beacons (e.g., comprising pilot, paging, and synchronization channels) by the access points 104-108. In a typical implementation, the access points 104-108 are femtocells.

Each of the access points 104-108 includes a beacon component for transmitting beacons according to a schedule. To reduce the complexity of FIG. 1, a beacon component 112 is depicted only for the access point 104 (e.g., a designated cluster head of a cluster of femtocells). In practice, similar functionality is included in each of the access points 106-108.

The access terminal 102 includes a location component 114 for receiving beacons and processing received beacons to facilitate determining a location of the access terminal 102. For example, in some implementations, the access terminal 102 determines its location based on received beacons (e.g., by comparing a fingerprint based on received beacons with a database of location fingerprints). Alternatively, in other implementations, the access terminal 102 sends information associated with the received beacons to another entity (e.g., a serving access point or a network entity) to enable that other entity to determine the location of the access terminal 102.

In practice, the access terminal 102 will move around the geographical area supported by the system 100. Thus, as represented by the dashed access terminal blocks in FIG. 2, the access terminal 102 will receive beacons from various locations within this area.

To reduce the complexity of FIG. 1, only a few access points and one access terminal are shown. It should be appreciated, however, that a typical system will include many more access points that support many more access terminals. All of these access points may transmit beacons in accordance with the teachings herein, and these beacons will be received by various access terminals to enable the locations of these access terminals to be determined. In some aspects, a beacon that is transmitted to enable an access terminal (or some other entity) to determine its location may be referred to as a location beacon.

At least one of the entities of FIG. 1 includes a scheduler 116 for scheduling beacon transmissions. To reduce the complexity of FIG. 1, this functionality is depicted as optionally being in the access point 104 (e.g., a designated cluster head of a cluster of femtocells) or in the network entity 110. In practice, at least some of the scheduling-related functionality (e.g., conducting network listen measurements and/or receiving measurement reports from the access terminal 102) is performed in each of the access points 104-108. The rest of the functionality (e.g., determining a schedule based on information collected by the access points 104-108) may be implemented in a distributed manner by the access points 104-108, or implemented by a single entity such as a designated one of the access points 104-108 (e.g., a designated head of a femtocell cluster) or a network entity (e.g., a femtocell management server (FMS), a Home NodeB (HNB) management server (HMS), a HNB gateway (HGW), etc.). For example, in some implementations, this functionality is partially implemented in the network entity 110 (e.g., a network entity deployed by a network operator) and partially implemented in the access points 104-108. In other implementations, however, this functionality is implemented in a distributed manner entirely within each of the access points 104-108 (and any other associated access points in the system 100).

Figure 2:
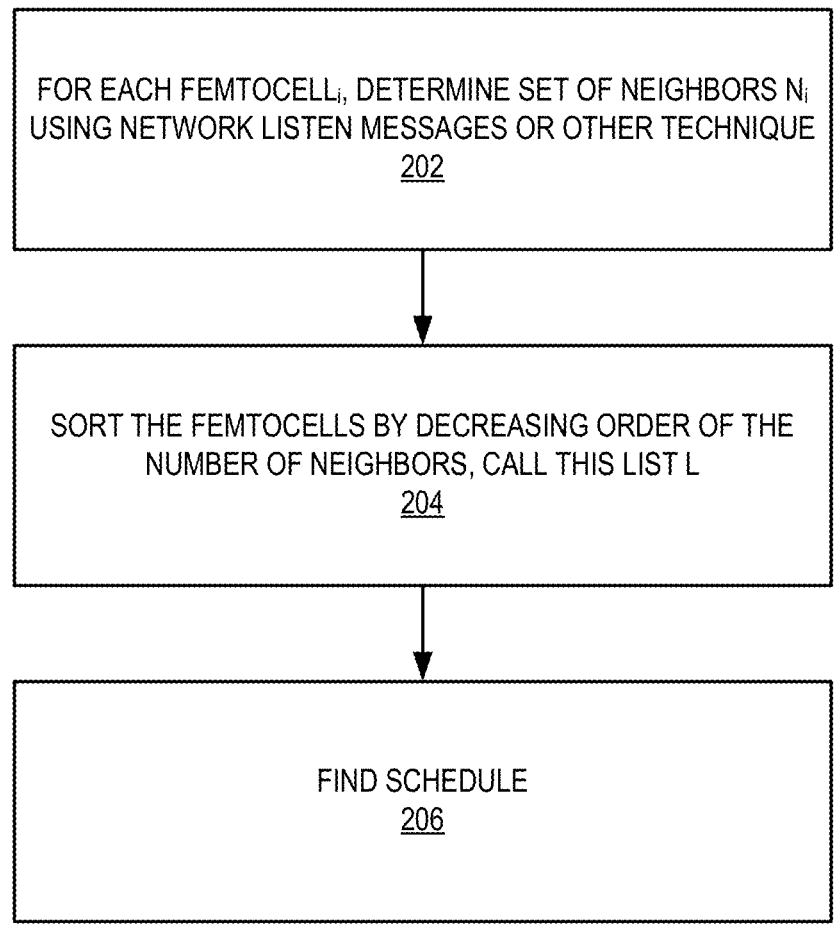
FIG. 2 is a flowchart of several sample aspects of operations that may be performed in conjunction with a time-only orthogonalization procedure.
Figure 3:
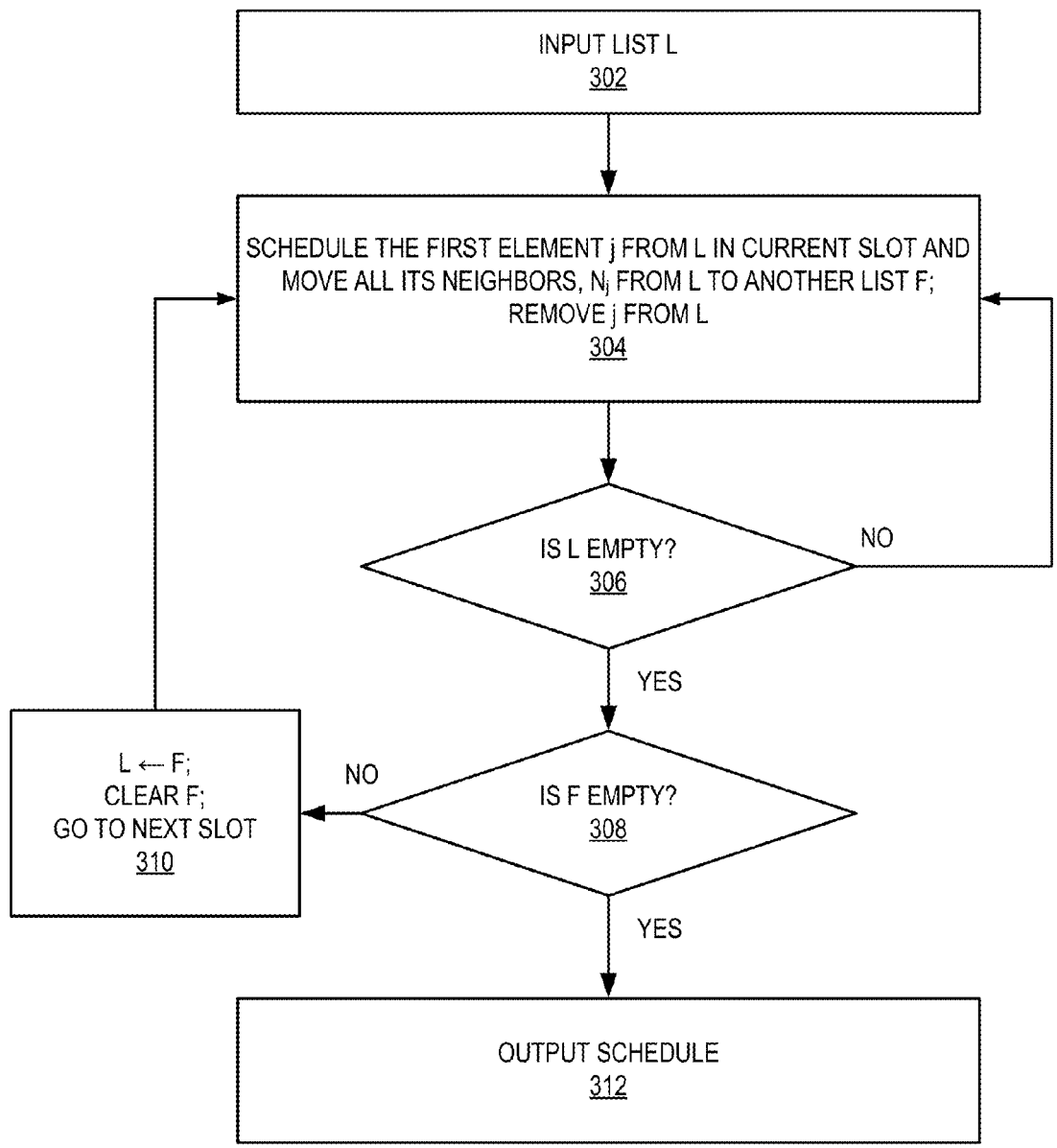
FIG. 3 is a flowchart of several sample aspects of scheduling operations.
Figure 4:
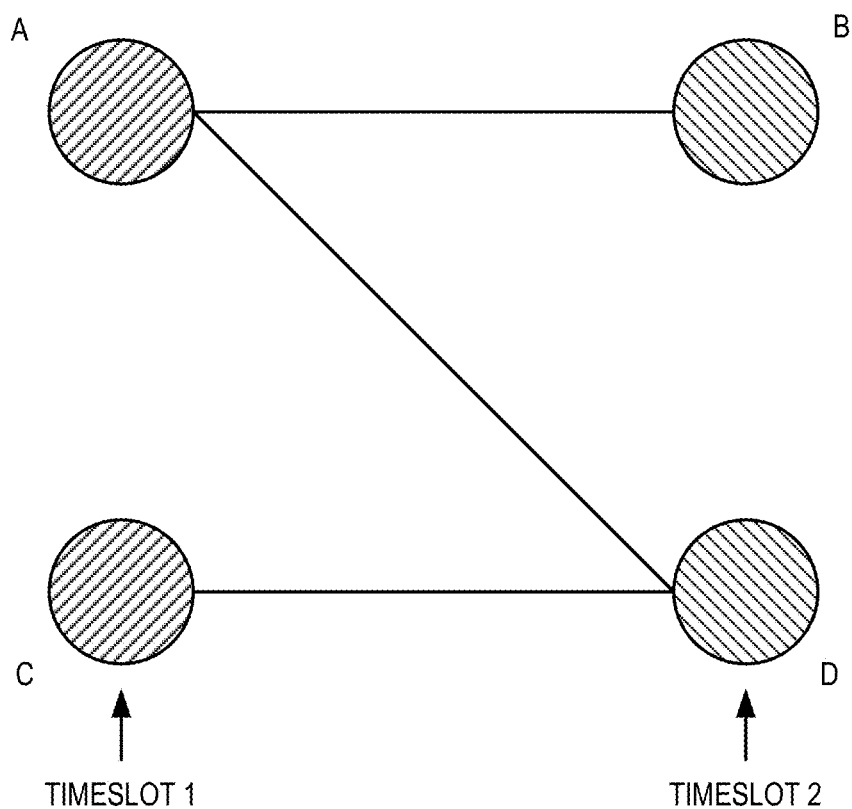
FIG. 4 is a simplified diagram illustrating an example of timeslot allocation.

With the above overview in mind, two schemes for orthogonalizing femtocell beacons are described below with reference to FIGS. 2-9. Briefly, FIGS. 2-4 illustrate a first approach where femtocell beacons are orthogonalized in time. FIGS. 5-9 illustrate a second approach where femtocell beacons are orthogonalized in both time and frequency. It should be appreciated that the disclosed techniques may be applicable to beacons transmitted by other types of access points, and to access points based on different types of wireless communication technologies.

Figure 13:
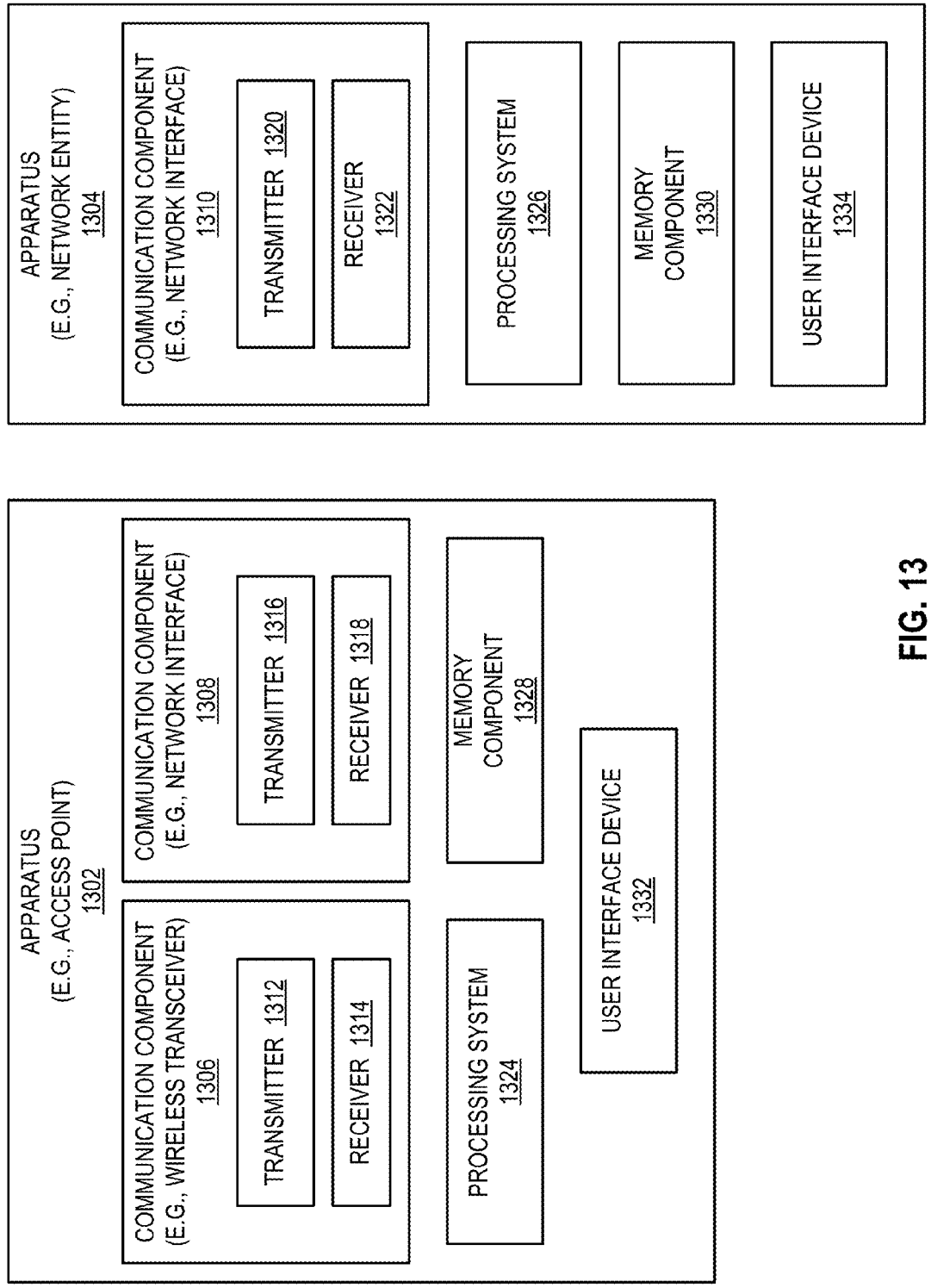
FIG. 13 is a simplified block diagram of several sample aspects of components that may be employed in communication nodes.

For illustration purposes, the operations of FIGS. 2-9 (or any other operations discussed or taught herein) may be described as being performed by specific components (e.g., the components shown in FIG. 1, or FIG. 13, etc.). It should be appreciated, however, that these operations may be performed by other types of components and may be performed using a different number of components. It also should be appreciated that one or more of the operations described herein may not be employed in a given implementation.

Referring initially to FIGS. 2-4, in this approach, the beacons from potentially interfering femtocells are spaced apart in time so that their transmissions do not overlap. One approach for identifying potentially interfering femtocells is to monitor for network listen messages at the femtocells. Beacons from two femtocells can be considered to be potentially interfering (when transmitted concurrently), if they are transmitted by femtocells that can hear each other's network listen messages. This suggests that from a conceptual viewpoint a network graph can be constructed. The vertices of the graph are the femtocells, and an edge exists between two femtocells if they can hear each other's network listen messages. A time schedule is thus obtained from the graph using a graph coloring scheme (e.g., as described below in conjunction with FIG. 4).

FIG. 2 describes an example of a time-only orthogonalization procedure.

As represented by block 202 of FIG. 2, each femtocell i creates its list of neighbors, $N_i$, using a network listen module-based technique or some other technique. As an example of an alternative technique, the list of neighbors for a femtocell may be constructed offline based on a pathloss database (e.g., a so-called heatmap that indicates, for each of a plurality of locations in the coverage area, the pathloss to each femtocell that can be detected at that location) and the knowledge of the transmission powers for the beacons.

As represented by block 204, the list of femtocells is sorted. For example, the list may be sorted by non-increasing order of the number of neighbors. In this example, the femtocell having the largest number of neighbors (e.g., 5) is first in the list, the femtocell having the next largest number of neighbors (e.g., 4) is next in the list, and so on.

By sorting the femtocells in this manner, more efficient scheduling may be achieved. For example, without such ordering, (e.g., femtocells with fewer detected neighbors allocated first), timeslot allocations may be made for a set of femtocells before determining that a first femtocell (e.g., one subject to interference from the set of femtocells) needs to be protected from interference by the set of femtocells. Thus, different timeslots could be allocated for the femtocells of the set, even though a common timeslot could be allocated for those femtocells. In contrast, through the use of ordering as taught herein, it is more likely that the femtocells of the set would be identified as interferers to the first femtocell and assigned the same timeslot (different from the timeslot of the first femtocell).

As discussed above, this scheduling operation may be performed by an entity such as network entity, one of the femtocells, or some other entity. In such a case, the entity may receive neighbor information (e.g., the lists of potential interferers) from each of the femtocells to enable that entity to determine the schedule.

As represented by block 206, the femtocells are allocated timeslots, such that a femtocell and its neighbors are not scheduled in the same timeslot. Since the beacons from neighboring femtocells are transmitted in different timeslots, an access terminal in the vicinity of these femtocells will not receive interfering beacons from these femtocells. Again, this scheduling operation may be performed by an entity such as network entity, one of the femtocells, or some other entity. Typically, the same entity would perform the operations of blocks 204 and 206.

FIG. 3 illustrates an example of a scheduler procedure (e.g., corresponding to block 206 of FIG. 2 and blocks 512 and 518 of FIG. 5 discussed below). As represented by block 302, an input to the scheduler is the ordered list L (e.g., from FIG. 2).

As represented by block 304, the first element j (e.g., corresponding to a beacon of a particular femtocell) from the list L is scheduled in the current timeslot (e.g., the first timeslot). The neighbors of this element j are designated $N_j$. All of these neighbors are moved from the list L to another list F. This is done so that the neighbors of j will not be scheduled in the same timeslot as j. The element j is then removed from the list L.

As represented by blocks 306 and 308, the procedure repeatedly operates on the lists L and F until all femtocells (e.g., all beacons) are scheduled.

At block 306, if the list L is not empty, the operational flow proceeds back to block 304. During this next iteration of block 304, the element j (e.g., the second element j) that is now first in the list (e.g., after the removal of the first j and its neighbors) is scheduled in the same timeslot as the first j. All of the neighbors (designated $N_j$) of this element j are moved from the list L to the list F. This element j is then removed from the list L. The operations of blocks 304 and 306 are thus repeated until all of the non-neighbor elements of L are scheduled (e.g., in the first timeslot).

At block 308, the procedure checks to see whether F is empty. If not, the operational flow proceeds to block 310. At block 310, the list F is moved into the list L, the list F is cleared, and scheduling commences for the next timeslot (e.g., the second timeslot in the first iteration of block 310). The operations described above are then repeated to allocate femtocells (e.g., beacons) for this next timeslot. For example, the first neighbor of the first j may be scheduled during the next iteration of block 304 and the neighbors of this element moved to the list F. A similar operation may be performed for other elements that have been put back in the list L.

As represented by block 312, once both lists L and F are empty, the scheduling procedure is complete. Hence, the resulting schedule may be sent to the appropriate entity or entities. For example, an entity (e.g., a network entity or one of the femtocells) that determines the schedule may send corresponding schedule information to each of the femtocells so that each femtocell will transit its beacon during the designated timeslot.

FIG. 4 illustrates an example of network graph for a case where a femtocell A has detected femtocells B and D as neighbors, femtocell B has detected femtocell A as a neighbor, femtocell C has detected femtocell D as a neighbor, and femtocell D has detected femtocells A and C as neighbors. In this case, femtocell A should not be scheduled on the same timeslot as femtocells B and D and femtocell D should not be scheduled on the same timeslot as femtocell C. However, femtocells A and C can be scheduled on the same timeslot. Likewise, femtocells B and D can be scheduled on the same timeslot. Consequently, the femtocells are "colored" (as indicated by the slanted lines of different orientation) for the desired timeslot allocation. For example, femtocells A and C can be scheduled on timeslot 1, while femtocells B and D can be scheduled on timeslot 2.

An example of an algorithm that may be employed to implement the above-described time-only orthogonalization procedure is set forth in Algorithm 1:

```
1. TimeOrthogonalization
2.    Global i ← 0
3.    For every femtocell i
4.       Find set of neighbors Ni using network listen
5.       Let L be the list of femtocells ordered by decreasing order of
number of neighbors
6.    TimeSlots = FindSchedule(L,N)
7.    return TimeSlots
1. FindSchedule(L,N)
2.    If L = 0;
3.       return Schedule
4.    S ⇐ 0; F ⇐ 0;
5.    For each j ∈ L
6.       If j ∉ F;
7.          S ⇐ S ∪ j
8.          F ⇐ F ∪ N_j
9.          L ⇐ L/N_j
10.   Schedule{S} ⇐ i + 1
11.   FindSchedule(F,N)
```

For the TimeOrthogonalization procedure of Algorithm 1, steps 3 and 4 correspond to block 202 of FIG. 2, step 3 corresponds to block 204, and step 206 corresponds to block 206.

The FindSchedule procedure of Algorithm 1 is recursive. At steps 2 and 3, the schedule is returned if the list L is empty. At step 4, the lists S and F are cleared for each iteration of the recursive function. At steps 5-10, the procedure schedules the timeslots. In particular, at step 6, the procedure checks to see whether the current element j has been moved to the list of neighbors F. If not, at step 7, the current element j is added to the list S, thereby scheduling the femtocell (beacon) during the current timeslot specified by S. At step 8, the neighbors ($N_j$) of the current element j are added to the list F. At step 9, these neighbors $N_j$ are removed from the list L. At step 10, scheduling moves to the next timeslot. The procedure then recursively calls itself until all of the elements of the list L are scheduled.

Various modifications may be made to the above scheduling techniques. For example, a network listen-based algorithm may not entirely capture the interference between femtocells in the network. In other words, two femtocells that do not share an edge between them in the conceptual graph (e.g., two femtocells that are not indicated as being potential interferers by the network listen operations) may still interfere with each other if their beacons are sent at the same time. This may be because the femtocells themselves could be too far apart to receive each other's network listen messages, yet their coverage areas still overlap. However, access terminals at some of the locations in the overlap area may not be able to decode the beacons from the two femtocells when they are sent together. On the other hand, there could be locations that can successfully receive and decode a pair of beacons sent by femtocells that share an edge between them, even when these beacons are sent together.

The network listen-based graph can be improvised to obtain a more detailed neighbor graph. This can be achieved by going through the pathloss database for every femtocell and finding those sets of femtocells that may interfere with each other if they transmit beacons concurrently. However, going through the entire database to find combinations of femtocells that could interfere with each other may be computationally intensive. For instance, a pair of femtocells may interfere at some locations, yet may be received without any trouble at other locations. Furthermore, both the femtocells together may interfere with a third femtocell, while they may not cause any interference when transmitted individually.

In accordance with the teachings herein, certain approximations may be made for finding a more detailed graph. For instance, starting with a network listen-based graph as above, whenever the number of beacons received at a location is smaller than the number of beacons scheduled in the current timeslot, diagnostics are run to determine whether the smaller number is due to low signal strength of the received signal (e.g., due to the femtocell being relatively far from the location) or due to interference from multiple beacons being received concurrently. If the fraction of locations at which the beacons in a timeslot cannot all be received together due to interference exceeds a threshold (e.g., 80% or 90% of the locations), an edge is drawn between the beacons in that timeslot and a new schedule is determined using the resultant graph. This mechanism is repeated until a reasonable confidence is reached in the schedule. The above diagnostics may include, for example, temporarily controlling the beacon transmissions by femtocells so that an access terminal can measure each beacon individually.

Referring now to FIGS. 5-9, one aspect of the scheme of FIGS. 2-4 is that the beacon schedules are decided independent of the access terminal locations. Therefore, all the femtocells in the network, irrespective of their proximity to each other, are scheduled without considering whether or not an access terminal can receive all the beacons that are scheduled in the timeslots. However, because an access terminal may receive only a subset of femtocell beacons depending on its location, the beacons scheduled in some of the timeslots may be irrelevant for an access terminal that is relatively far from the femtocells that transmitted the beacons. This, in turn, may increase the time to obtain a location fix.

Figure 5:
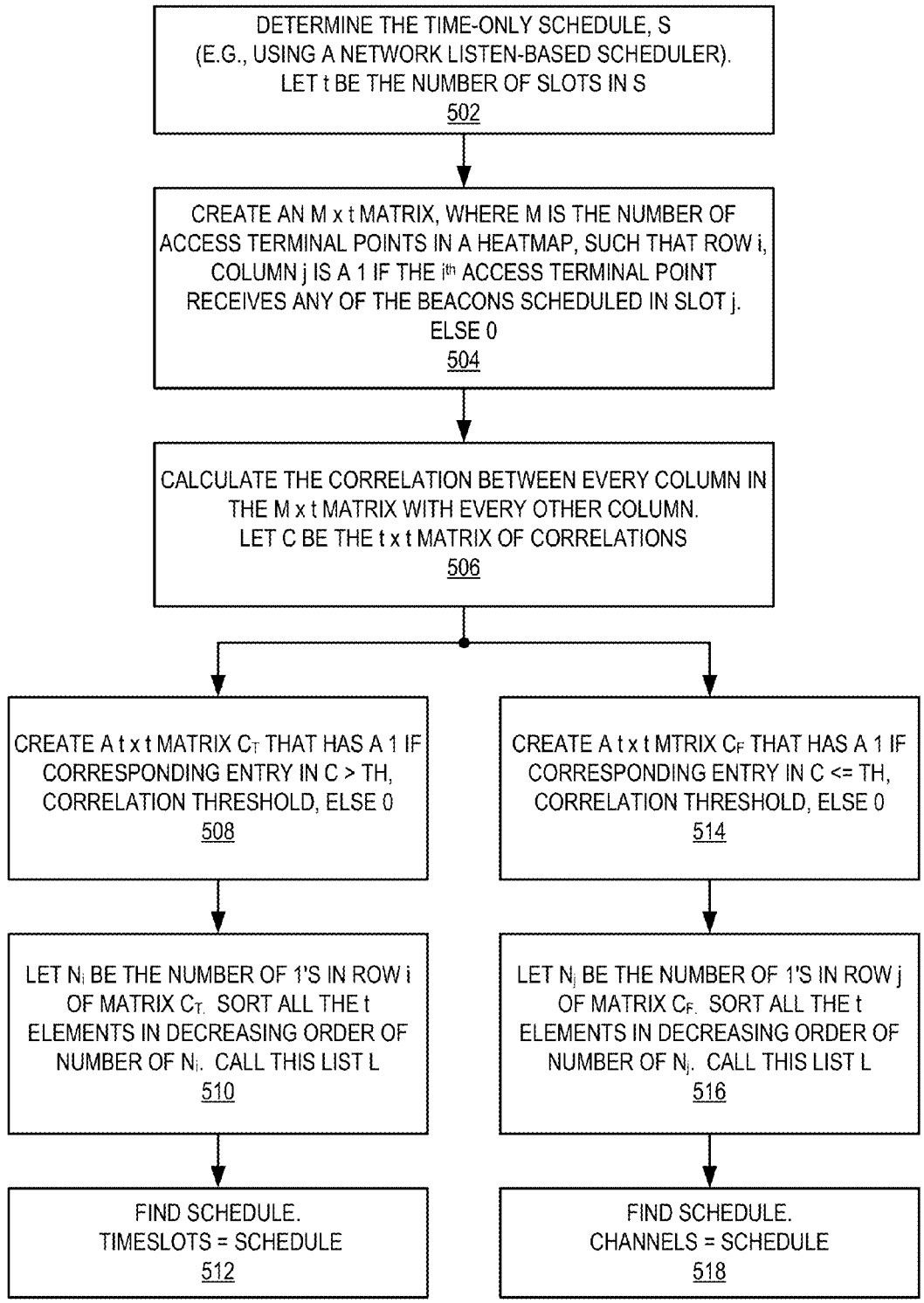
FIG. 5 is a flowchart of several sample aspects of operations that may be performed in conjunction with a frequency and time orthogonalization procedure.

FIG. 5 describes an example of an alternative approach that schedules femtocells (e.g., beacons) on both frequency and time. In this case, there is more than one channel available for scheduling the beacons.

As represented by block 502 of FIG. 5, this approach starts with a time-only schedule. For example, a schedule defined according to the procedure of FIGS. 2 and 3 may be used here. For convenience, such a time-only schedule may be referred to in the discussion that follows as a network listen-based schedule. It should be appreciated that a time-only schedule may be defined in other ways.

FIG. 6 illustrates a relatively simple example of a time schedule. Here, beacons 1 and 5 are scheduled in timeslot A, beacon 3 is scheduled in timeslot B, beacons 2 and 6 are scheduled in timeslot C, and beacon 4 is scheduled in timeslot D.

The operations of FIG. 5 involve rearranging the time-only schedule on both time and frequency. These operations may be performed by a network entity, a femtocell, or some other suitable entity (e.g., similar to the scheduling operations discussed above).

As represented by block 504, the entire pathloss database (e.g., heatmap) is analyzed to record which beacons can be received individually by each of the access terminal locations (without considering any interference effects). This may be obtained by calculating the pilot Ecp=Nt for each of the beacons and comparing them with an SINR threshold. Another matrix H is constructed where the number of rows equals the number of access terminal locations in the database. In this case, however, the number of columns is set to the number of timeslots t in the network listen-based schedule.

The matrix is populated with either a 1 or a 0, such that an entry on row m, column t is a 1 if the m-th access terminal location can receive any of the beacons scheduled in timeslot t in the network listen-based schedule; otherwise, it is set to 0. The idea here is to identify which access terminal locations can receive a beacon in each of the timeslots in the network listen-based schedule.

As represented by block 506, the cross correlation between every pair of timeslots in the NLM schedule is evaluated by finding the correlation between the columns in the H matrix. The number of rows and columns in the resulting correlation matrix, C, will be equal to the number of timeslots t in the network listen-based schedule. The entries in the matrix C will be numbers between +1 and −1, inclusive, where each value reflects the likelihood of receiving the beacons that are scheduled in two different timeslots calculated over all access terminal locations.

If a majority of access terminal locations can successfully receive any of the beacons that are scheduled in two different timeslots, then the correlation between the two timeslots will be high. In other words, when a correlation entry between two timeslots is high, it may be beneficial to schedule the beacons in those timeslots on substantially contiguous timeslots since a majority of access terminals may be requiring those beacons for a location fix. On the other hand, the pairs of timeslots that are not highly correlated suggest that not many access terminal locations rely on the beacons from both of the timeslots together for their location fix.

FIG. 7 illustrates an example of a correlation matrix based on the time schedule of FIG. 6. Of note, higher degrees of correlation exist for pair A and B, for pair A and D, and for pair C and D. Conversely, lower degrees of correlation exist for pair A and C, for pair B and C, and for pair B and D.

In some aspects, the correlation matrix suggests a mechanism for re-arranging the network listen-based schedule to speed up the location fix process, while also providing opportunities for scheduling the beacons on different channels. The actual time schedule and the channel allocation may be determined (conceptually) using the graph coloring technique as in the network listen-based case.

To obtain the time schedule, a graph is constructed whose vertices are the timeslots from the network listen-based schedule. An edge exists between two vertices if the correlation between them is greater than a threshold (e.g., 0). For the example of FIG. 7, this relationship is shown by the graph 802 in FIG. 8.

Note that the vertices in this graph represent the set of femtocells that are scheduled to transmit their beacons at that timeslot (see FIG. 6). Slanted lines are again used to indicate "coloring." Thus, as timeslots A and C are relatively uncorrelated, the corresponding beacons may be transmitted concurrently. A similar relationship exists between timeslots B and D. In contrast, due to the relatively high correlation between timeslot A and timeslots B and D, the corresponding beacons should not be transmitted concurrently. Similarly, due to the relatively high correlation between timeslot C and timeslot D, the corresponding beacons should not be transmitted concurrently.

The graph 802 can be colored using the procedure in FIG. 4 to obtain the time schedule. The channel allocations can be similarly obtained by coloring the inverse of the graph used for obtaining the timeslots. The inversion of the graph 802 is represented by the graph 804 in FIG. 8. Again, the slanted lines of different orientation indicate different "coloring." Here, it may be seen that timeslots A and C should be transmitted on different frequencies, as should timeslots B and D.

Combining the time scheduling of the graph 802 and the frequency scheduling of the graph 802, the final scheduling for the timeslots is determined. FIG. 9 illustrates this final mapping from the original time-only schedule 902 (from FIG. 6) to scheduling the beacons from timeslots A and D on a first radio frequency (F1) and scheduling the beacons from timeslots C and B on a second radio frequency (F2) as shown by the graph 904. Note that in accordance with the time scheduling, the beacons for timeslot A are in a different timeslot than the beacons for timeslots B and D. In addition, the beacons for timeslot C are in a different timeslot than the beacon for timeslot D. Thus, highly correlated beacons are transmitted on different timeslots. Conversely, less correlated beacons may be transmitted during a common (i.e., the same) timeslot, but may be transmitted on different radio frequencies. From the graph 904 it should be appreciated that by controlling the order in which an access terminal monitors for beacons (e.g., which timeslot, which frequency), the access terminal may readily acquire all of the beacons of interest.

Referring again to FIG. 5, an algorithmic approach to obtaining the timeslot schedule and a radio frequency (e.g., channel) schedule will be described. The left-hand column consisting of blocks 508-512 describes operations for finding a timeslot schedule. Conversely, the right-hand column consisting of blocks 514-518 describes operations for finding a channel schedule. The operations are similar except that blocks 508-512 involve sorting based on the number of rows with high correlation, while blocks 514-518 involve sorting based on the number of rows with low correlation.

As represented by block 508, a t-by-t matrix $C_T$ is created based on the matrix C. Each element of the matrix $C_T$ will have a value of 1 if the corresponding entry of the matrix C is greater than a correlation threshold (TH), otherwise the element will have a value of 0. In general, the correlation threshold is set to a value that is indicative of whether a relatively high correlation is indicated. For example, assuming the correlation values in the matrix C are within the range −1 to 1, the correlation threshold may be set to a value of 0, a slightly positive value (e.g., 0.01), a relatively high positive value (e.g., 0.5), or some other value.

As represented by block 510, the number ($N_i$) of is in each row of the matrix $C_T$ is determined A set of t elements is then sorted in decreasing order of the number $N_i$. For example, the row having the largest $N_i$ (e.g., 4) is first in the order, the row having the next largest $N_i$ (e.g., 3) is next in the order, and so on. The resulting set of ordered elements is referred to as the list L.

As represented by block 512, the timeslots from the list L are allocated, such that relatively correlated timeslots are not scheduled in the same timeslot. Since the beacons for these different timeslots will thus be transmitted in different timeslots, an access terminal in the vicinity of the femtocells that transmits the beacons will not receive interfering beacons from these femtocells. However, the sorting of block 510 grouped together timeslots that have high correlation with other timeslots. Hence, highly correlated timeslots will tend to be allocated in substantially contiguous timeslots.

Referring now to the channel scheduling operations of blocks 514-518, as represented by block 514, a t-by-t matrix $C_F$ is created based on the matrix C. Each element of the matrix $C_F$ will have a value of 1 if the corresponding entry of the matrix C is less than or equal to a correlation threshold (TH), otherwise the element will have a value of 0. This correlation threshold may correspond to the correlation threshold of block 508.

As represented by block 516, the number ($N_j$) of is in each row of the matrix $C_F$ is determined A set of t elements is then sorted in decreasing order of the number $N_j$. For example, the row having the largest $N_j$ (e.g., 4) is first in the order, the row having the next largest $N_j$ (e.g., 3) is next in the order, and so on. The resulting set of ordered elements is referred to as the list L.

As represented by block 518, the timeslots from the list L are allocated to radio frequencies (e.g., carriers), such that relatively uncorrelated timeslots are scheduled on different radio frequencies. The beacons are then finally allocated according to the timeslot allocation of block 512 and the radio frequency allocation of block 518 (e.g., as indicated in graph 904 of FIG. 9).

The operations of FIG. 5 may be better understood by reference to Algorithm 2:

```
1. FreqTimeOrthogonalization
2. TimeSchedule = TimeOrthogonalization
3. For every MS point m in the database
4.     For every slot t in TimeSchedule
5.         If m receives any of the beacons scheduled at t
6.             H(m, t) ← 1
7.         Else
8.             H(m, t) ← 0
9. C = Corr(H) //Corr finds the column-wise correlation of a matrix
10. For every element i, j in C
11.     If C(i, j) > Th
12.         C_T(i, j) ← 1
13.         C_F(i, j) ← 0
14.     Else
15.         C_T(i, j) ← 0
16.         C_F(i, j) ← 1
17. For every slot i in TimeSchedule
18.     Let N_i be column ids with 1 in row i of C_T
19. Let L be the list of slots ordered by decreasing order of number of 1's
20. TimeSlots = FindSchedule(L,N_i)
21.     For every slot j in TimeSchedule
22.         Let N_j be column ids with 1 in row j of C_F
23.     Let L be the list of slots ordered by decreasing order of number of 1's
24. Channels = FindSchedule(L,N_j)
25. return TimeSlots,Channels
```

In Algorithm 2, steps 3-8 correspond to block 504 of FIG. 5, step 9 corresponds to block 506, steps 10-16 correspond to blocks 508 and 514, steps 17-19 correspond to block 510, step 20 corresponds to block 512, steps 21-23 correspond to block 516, and step 24 corresponds to block 518.

During a location determination (e.g., estimation) procedure, an access terminal may measure and report beacon signal strength from only one beacon channel in a timeslot. However, the access terminal may hop across different beacon channels on the next timeslot. Because the beacons are transmitted periodically, the access terminal may measure the beacons on a channel that was not previously reported during the next turn when the same combinations of beacons are scheduled in a timeslot. However, the order in which the access terminal visits the beacon channels can affect the time to obtain a location fix. For instance, the channel in which the access terminal decides to measure first may contain beacons from femtocells that are far away from the access terminal, resulting in a lower SINR at the access terminal. As a result, the access terminal may not be able to report those signal strength values for a location fix. It is therefore important in some aspects to hop across the beacon channels in an order that can quicken the location fix process.

In some implementations, the serving femtocell decides the channel hop patterns for the access terminal. Initially, the serving femtocell may instruct the access terminal to report the beacon strength from a randomly chosen channel. Alternatively, the femtocell may choose the channel for reporting based on historical information; for instance, the channel with beacons that are successfully reported by a higher fraction of access terminals in the past. The femtocell may thus guide the channel hop pattern based on whether the access terminal was successful or not in reporting the beacons in the current channel.

Depending on the network providers and the relative geographical locality, there may not be enough beacon channels to schedule the beacons across all of the channels specified by a scheduling procedure. Consequently, a procedure for optimizing the number of beacon channels used for scheduling may be employed. Considering the number of femtocells scheduled on each channel, the beacons are moved from the channel that has the least number of beacons to the channel with which it has the highest correlation, but on a different timeslot. This approach follows the above scheduling methodology, where beacons that are highly correlated may be scheduled on the same channel on contiguous timeslots. This procedure can be repeated until the number of channels in the resulting schedule equals the number of available beacon channels.

In practice, femtocells may have to transmit beacons for purposes other than location. Due to scarcity of spectrum resources, femtocells may share the frequency channels used by macrocells or may be deployed on frequency channels adjacent to macrocell channels. To attract the macrocell users camped-on or idling-on the macrocell frequencies to the femtocell frequency, a femtocell radiates beacon signals (e.g., comprising pilot, paging, and synchronization channels) on the macrocell frequencies. Information included in the beacon signal (e.g., control channel overhead messages) will enable an access terminal that is camped-on or idling-on the macrocell frequency to be handed-in or redirected to the femtocell frequency. Such beacons may be referred to as reselection beacons. The reselection beacons may interfere with the transmissions on the macro channel in some cases. Consequently, the reselection beacons may be sent at a lower power with occasional high power beacons interspersed in between.

An example of a pattern used to transmit reselection beacons follows. A femtocell sends a reselection beacon on a macrocell frequency for a duration of 8 slots, after which it switches to another macro frequency. The femtocell alternates between the two macro frequencies after every 8 slots for up to 64 slots. Each slot is 80 ms long, and therefore a reselection beacon is sent on a macro frequency for 640 ms. The alternating pattern will result in sending 8 reselection beacons over a 64 slot duration (4 each on the two macro frequencies). In some implementations, for an access terminal to be able to hand-in to a femtocell network, it has to receive two reselection beacons from a femtocell within a span of 64 slots. Moreover, the time at which an access terminal wakes up for a reselection beacon, though it is synchronized with the network, can be different for different access terminals. To ensure that an access terminal waking up in any of the 64 slots is able to receive two reselection beacons, the entire pattern of reselection beacons over the 64 slot duration is repeated for another 64 slots. Later, the femtocell can choose to send the reselection beacons on two other macrocell frequencies, if any, or repeat on the same pair of frequencies. Whenever the femtocell returns back to sending the reselection beacons on the same pair of frequencies, it does so after a time offset. This is done to enable hand-in for those access terminal that have wakeup cycles that are not synchronized with (e.g., in phase with) the previous schedule.

Figure 10:
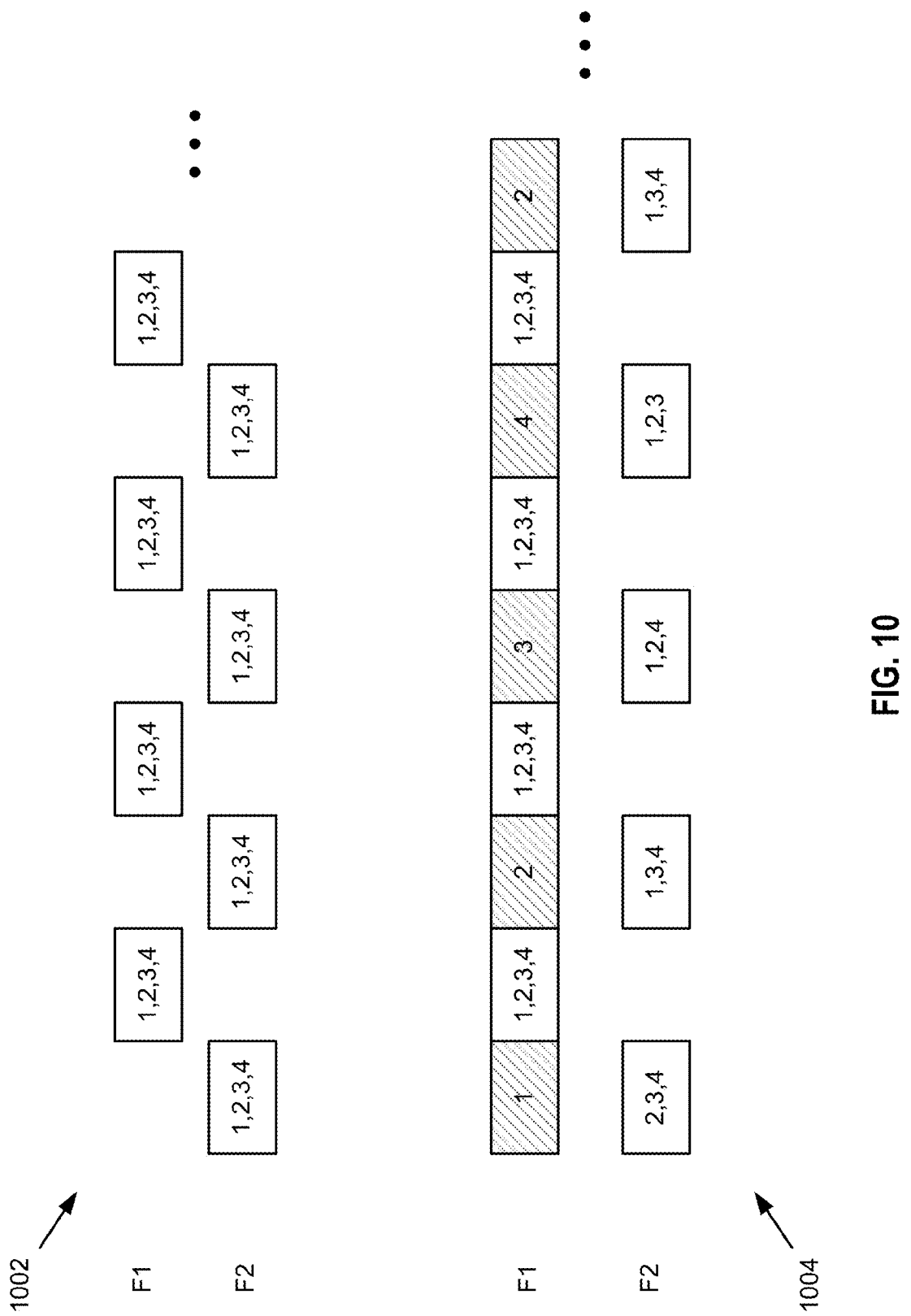
FIG. 10 is a simplified diagram illustrating an example of interspersing beacons with reselection beacons.

The diagram 1002 at the top half of FIG. 10 illustrates an example of reselection beacon transmissions on two frequencies F1 and F2. In this example, femtocells 1, 2, 3, and 4 transmit reselection beacons during each of block of time (e.g., each of which corresponds to 8 timeslots). Here, it may be seen that these femtocells alternate between transmitting reselection beacons on frequencies F1 and F2.

While femtocells may transmit their reselection beacons at the same time without adversely affecting the reselection procedure, a beacon used for location purposes (hereafter referred to as a location beacon in the discussion of FIG. 10 to distinguish from a reselection beacon) generally needs to be transmitted over a clean channel since the accuracy of positioning depends on how precisely the pathloss is estimated by the network from the access terminal signal strength reports. Therefore, reselection beacons by themselves may not be usable for positioning under conventional practice. However, some of the femtocells, depending on the transmission schedule, can send location beacons on a different channel than reselection beacons. Accordingly, in some aspects, location beacons are interspersed in between reselection beacons.

The diagram 1004 at the bottom half of FIG. 10 illustrates an example of interspersed location beacon transmission and reselection beacon transmissions on two frequencies F1 and F2. In this case, during every other block of time on frequency F1, one of the femtocells transmits a location beacon rather than a reselection beacon. As illustrated, the femtocell that transmits a location beacon on F1 does not transmit a reselection beacon on frequency F2.

The location beacons are sent on a different timeslot every time the schedule repeats so that the access terminal that missed the reselection beacon the first time does not miss the reselection beacon again. Specifically, in this example, rather than femtocell 1 transmitting a location beacon during the $9^{th}$ block of time on F1, the femtocell 2 transmits a location beacon, and so on.

As mentioned above, femtocells transmitting location beacons may not simultaneously send a reselection beacon (as these are now sent on different channels). Therefore, an access terminal that could have potentially used the reselection beacon from these femtocells for handing in to the femtocell network may not be able to do so. Thus, the use of location beacons as taught herein may delay the handover process for some access terminals.

Various modifications may be made to the functionality described above consistent with the teachings herein. For example, beacon scheduling algorithms may be either static or dynamic (e.g., on-demand). In the case of a static algorithm, the access points may transmit beacons according to the schedule irrespective of whether an access terminal requests a location fix or not. In the case of a dynamic beacon schedule, however, the beacon schedule may be adapted depending on the number of access terminals requesting a location fix. Furthermore, an access point may be instructed to not transmit a beacon if there are no access terminals requesting a location fix (or if the beacon is not necessary for determining the location of an access terminal).

Figure 11:
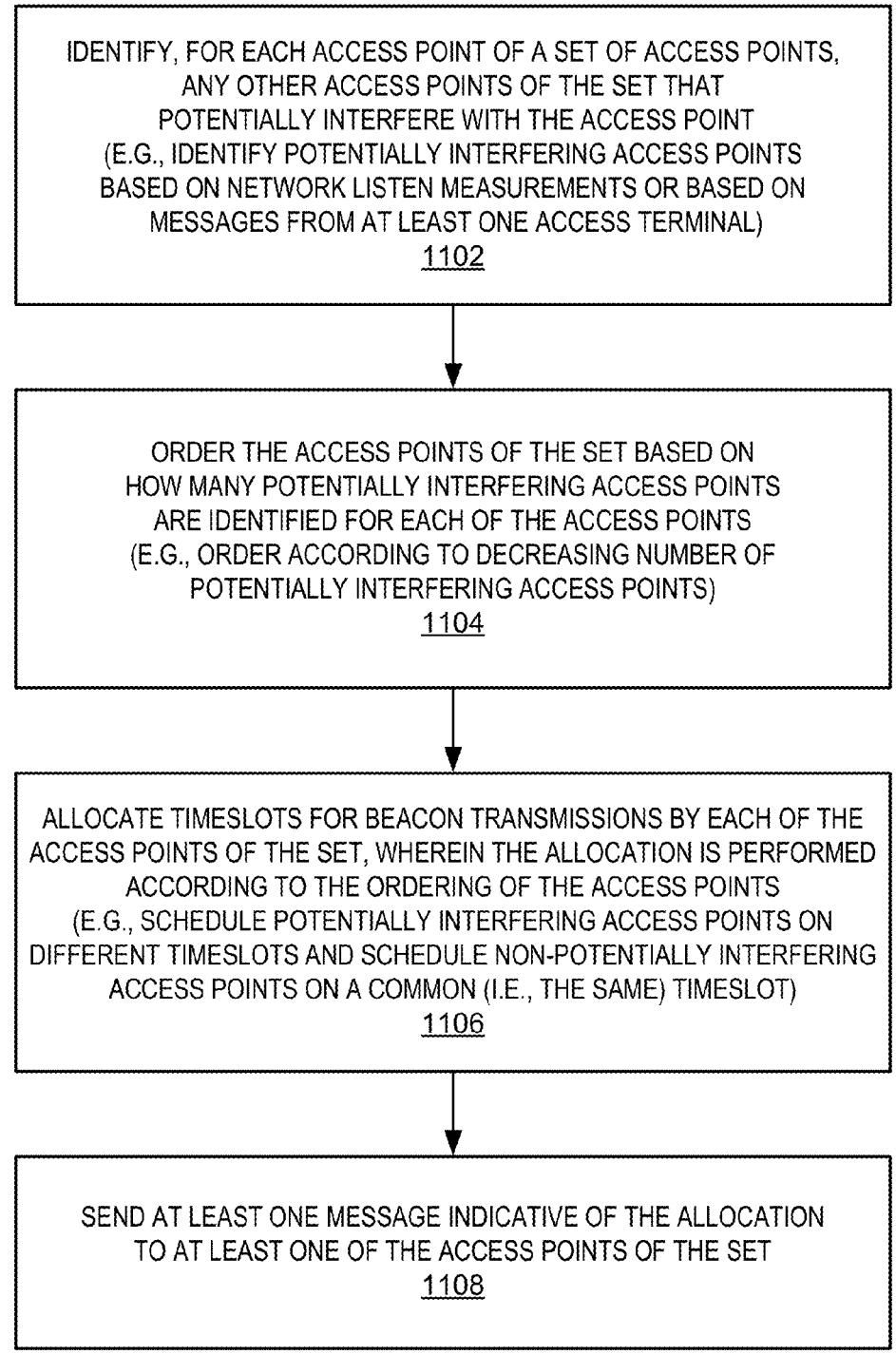
FIG. 11 is a flowchart of several sample aspects of operations that may be performed in conjunction with allocating timeslots for beacon transmission.

With the above in mind, additional details relating to timeslot allocation in accordance with the teachings herein will be described with reference to FIG. 11. These operations may be performed, for example, by a network entity, by an access point (e.g., a femtocell), by some other entity, or by a plurality of entities in cooperation.

As represented by block 1102, for each access point of a set of access points, any other access points of the set that potentially interfere with the access point are identified. As discussed herein, this operation may be performed to identify, for each access point, the neighbor access points for that access point.

In some aspects, the identification operation for each access point is based on signals received at that access point. For example, in some implementations, the identification of the potentially interfering access points comprises conducting network listen measurements (e.g., to determine which access points can be heard by a given access point). As another example, in some implementations, the identification of the potentially interfering access points comprises receiving measurement report messages from at least one access terminal (e.g., to determine which access points can be heard by an access terminal being served by a given access point). In some aspects, the identification of the potentially interfering access points comprises identifying subsets of neighboring access points.

In some implementations, these received signals (or information based on these signals) are forwarded from the access points of the set to the entity that determines the schedule. For example, the access points may forward measurement report messages or network listen measurements to a network entity, to a designated one of the access points, etc.

As represented by block 1104, the access points of the set are ordered based on how many potentially interfering access points are identified for each of the access points. For example, an access point with the most potentially interfering access points (e.g., the most neighboring access points) may be first in the list, an access point with the second most potentially interfering access points may be next (second) in the list, and so on.

As represented by block 1106, timeslots for beacon transmissions by each of the access points of the set are allocated according to the ordering of the access points at block 1104. For example, as discussed herein, allocations are made in a manner that improves the accuracy of an access terminal location determination (e.g., by reducing inter-beacon interference and thereby making more access points visible to the access terminal). Accordingly, in some aspects, the allocation of the timeslots comprises scheduling any access points that potentially interfere with each other on different timeslots. In addition, in some aspects, the allocation of the timeslots comprises cooperatively scheduling access points that do not potentially interfere with each other. For example, these non-interfering access points may be scheduled on a common (i.e., the same) timeslot.

As represented by block 1108, at least one message indicative of the allocation is sent to at least one of the access points of the set. For example, if the schedule is determined by a network entity, the network entity will send at least one message to the access points of the set to inform the access points of the allocation. In some cases (e.g., a broadcast message), all of the allocation information is sent to each access point. In other cases (e.g., dedicated messaging), the network entity sends a message to each access point, where the message includes the allocation information for that access point. If the schedule is determined by an access point, the access point will send at least one message to the other access points of the set to inform the access points of the allocation (e.g., via a broadcast message or dedicated messages).

Figure 12:
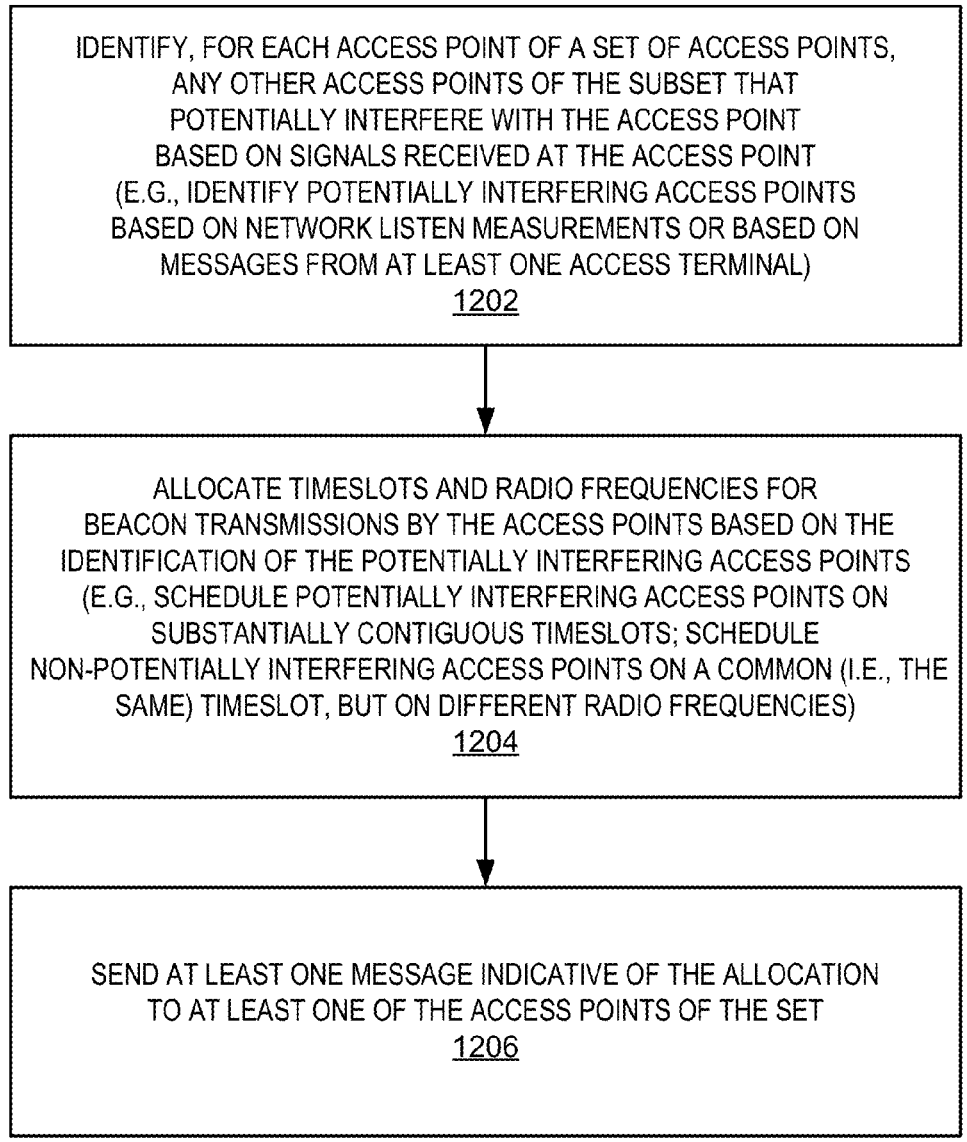
FIG. 12 is a flowchart of several sample aspects of operations that may be performed in conjunction with allocating timeslots and radio frequencies for beacon transmission.

Referring now to FIG. 12, additional details relating to time and frequency allocation in accordance with the teachings herein will be described. Again, these operations also may be performed, for example, by a network entity, by an access point (e.g., a femtocell), by some other entity, or by a plurality of entities in cooperation.

As represented by block 1202, for each access point of a set of access points, any other access points of the set that potentially interfere with the access point are identified. In some aspects, these operations may be similar to or based on the operations of block 1102 of FIG. 11.

In some aspects, the identification operation for each access point is based on signals received at that access point. For example, in some implementations, the identification of the potentially interfering access points comprises conducting network listen measurements (e.g., to determine which access points can be heard by a given access point). As another example, in some implementations, the identification of the potentially interfering access points comprises receiving measurement report messages from at least one access terminal (e.g., to determine which access points can be heard by an access terminal being served by a given access point).

Again, these received signals (or information based on these signals) may be sent from the access points of the set to the entity that determines the schedule. For example, the access points may forward measurement report messages or network listen measurements to a network entity, to one of the access points, etc.

As represented by block 1204, timeslots and radio frequencies for beacon transmissions by the access points of the set are allocated based on the identification of the potentially interfering access points. For example, as discussed herein, allocations are made in a manner that reduces the delay in finding a location fix for an access terminal (e.g., by grouping correlated beacons and scheduling beacons on different frequencies). In addition, allocations are made in a manner that improves the accuracy of an access terminal location determination (e.g., by reducing inter-beacon interference and thereby making more access points visible to the access terminal). Accordingly, in some aspects, the allocation of the timeslots comprises scheduling beacons that are detectable at at least one access terminal location for transmission during substantially contiguous timeslots. In addition, in some aspects, the allocation of the radio frequencies comprises scheduling beacons that are identified as not being potentially interfering for transmission on a plurality of the radio frequencies during a common timeslot. Similarly, in some aspects, the allocation of the radio frequencies comprises allocating access points that are scheduled to transmit beacons on a common timeslot to different radio frequencies.

In some aspects, the allocation of the timeslots comprises: determining that beacons initially allocated to different timeslots are detectable at at least one common location; and reallocating the beacons initially allocated to the different timeslots to substantially contiguous timeslots based on the determination that the beacons are detectable.

In some aspects, the allocation of the timeslots comprises: determining an initial allocation of the timeslots for the beacons; determining, for each location of a plurality of locations, whether any of the initially allocated beacons are received during each of the timeslots; determining, based on the determination of whether the initially allocated beacons are received at the locations during each of the timeslots, a likelihood of beacons being received from each unique pair of the timeslots at each of the locations; and determining whether to schedule beacons on contiguous timeslots based on the likelihoods of beacons being received from the timeslot pairs at each of the locations. In some aspects, the initial allocation of the timeslots comprises determining an initial beacon transmission schedule based on how many potentially interfering access points are identified for each of the access points, wherein any access points that potentially interfere with each other are scheduled on different timeslots.

In some aspects, reselection beacons are scheduled for transmission on at least one of the radio frequencies. In this case, the allocation of the timeslots and radio frequencies may comprise scheduling at least one of the beacons to be periodically transmitted instead of one of the reselection beacons on the at least one radio frequency.

As represented by block 1206, at least one message indicative of the allocation is sent to at least one of the access points of the set. For example, if the schedule is determined by a network entity, the network entity will send at least one message to the access points of the set to inform the access points of the allocation. In some cases (e.g., a broadcast message), all of the allocation information is sent to each access point. In other cases (e.g., dedicated messaging), the network entity sends a message to each access point, where the message includes the allocation information for that access point. If the schedule is determined by an access point, the access point will send at least one message to the other access points of the set to inform the access points of the allocation (e.g., via a broadcast message or dedicated messages).

FIG. 13 illustrates several sample components (represented by corresponding blocks) that may be incorporated into an apparatus 1302 or an apparatus 1304 (e.g., corresponding to the access point 104 or the network entity 110 of FIG. 1) to perform beacon scheduling operations as taught herein. It should be appreciated that these components may be implemented in different types of apparatuses in different implementations (e.g., in an ASIC, in a system on a chip (SoC), etc.). The described components also may be incorporated into other nodes in a communication system. For example, other nodes in a system may include components similar to those described for the apparatus 1302 to provide similar functionality. Also, a given node may contain one or more of the described components. For example, an apparatus may include multiple transceiver components that enable the apparatus to operate on multiple carriers and/or communicate via different technologies.

The apparatus 1302 includes at least one communication device 1306 (e.g., at least one wireless transceiver) for communicating with other nodes via at least one designated radio access technology. The communication device 1306 includes at least one transmitter 1312 for transmitting signals (e.g., messages, indications, information, and so on) and at least one receiver 1314 for receiving signals (e.g., messages, indications, information, and so on). In some embodiments, a communication device (e.g., one of multiple wireless communication devices) of the apparatus 1302 comprises a network listen module.

The apparatus 1302 and the apparatus 1304 each include one or more communication components 1308 and 1310 (e.g., one or more network interfaces), respectively, for communicating with other nodes (e.g., other network entities). For example, the communication components 1308 and 1310 may be configured to communicate with one or more network entities via a wire-based or wireless backhaul or backbone. In some aspects, the communication components 1308 and 1310 may be implemented as a transceiver configured to support wire-based or wireless communication. This communication may involve, for example, sending and receiving: messages, parameters, other types of information, and so on. Accordingly, in the example of FIG.

13, the communication component 1308 is shown as comprising a transmitter 1316 for sending signals and a receiver 1318 for receiving signals. Similarly, the communication component 1310 is shown as comprising a transmitter 1320 for sending signals and a receiver 1322 for receiving signals.

The apparatus 1302 also includes other components that may be used in conjunction with beacon scheduling operations as taught herein. For example, the apparatus 1302 includes a processing system 1324 for providing functionality relating to beacon scheduling operations and for providing other processing functionality. Similarly, the apparatus 1304 includes a processing system 1326 for providing functionality relating to beacon scheduling operations and for providing other processing functionality. For example, the processing system 1324 and/or the processing system 1326 may perform one or more of: identifying, for each access point of a set of access points, any other access points of the set that potentially interfere with the access point, wherein the identification is based on signals received at the access point; allocating timeslots and radio frequencies for beacon transmissions by the access points of the set based on the identification of the potentially interfering access points; and sending at least one message indicative of the allocation to at least one of the access points of the set; identifying, for each access point of a set of access points, any other access points of the set that potentially interfere with the access point; ordering the access points of the set based on how many potentially interfering access points are identified for each of the access points; or allocating timeslots for beacon transmissions by each of the access points of the set, wherein the allocation is performed according to the ordering of the access points. Each of the apparatuses 1302 or 1304 includes a respective memory component 1328 or 1330 (e.g., each including a memory device) for maintaining information (e.g., information, thresholds, parameters, and so on). In addition, each apparatus 1302 or 1304 includes a user interface device 1332 or 1334 for providing indications (e.g., audible and/or visual indications) to a user and/or for receiving user input (e.g., upon user actuation of a sensing device such a keypad, a touch screen, a microphone, and so on).

For convenience, the apparatuses 1302 and 1304 are shown in FIG. 13 as including components that may be used in the various examples described herein. In practice, the illustrated blocks may have different functionality in different implementations. For example, in some implementations, the functionality of the block 1324 or 1326 may be different in an embodiment that supports the scheme of FIG. 2 as compared to an embodiment that supports the scheme of FIG. 5.

The components of FIG. 13 may be implemented in various ways. In some implementations, the components of FIG. 13 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1306, 1308, 1324, 1328, and 1332 may be implemented by processor and memory component(s) of the apparatus 1302 (e.g., by execution of appropriate code and/or by appropriate configuration of processor components). Similarly, some or all of the functionality represented by blocks 1310, 1326, 1330, and 1334 may be implemented by processor and memory component(s) of the apparatus 1304 (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 14:
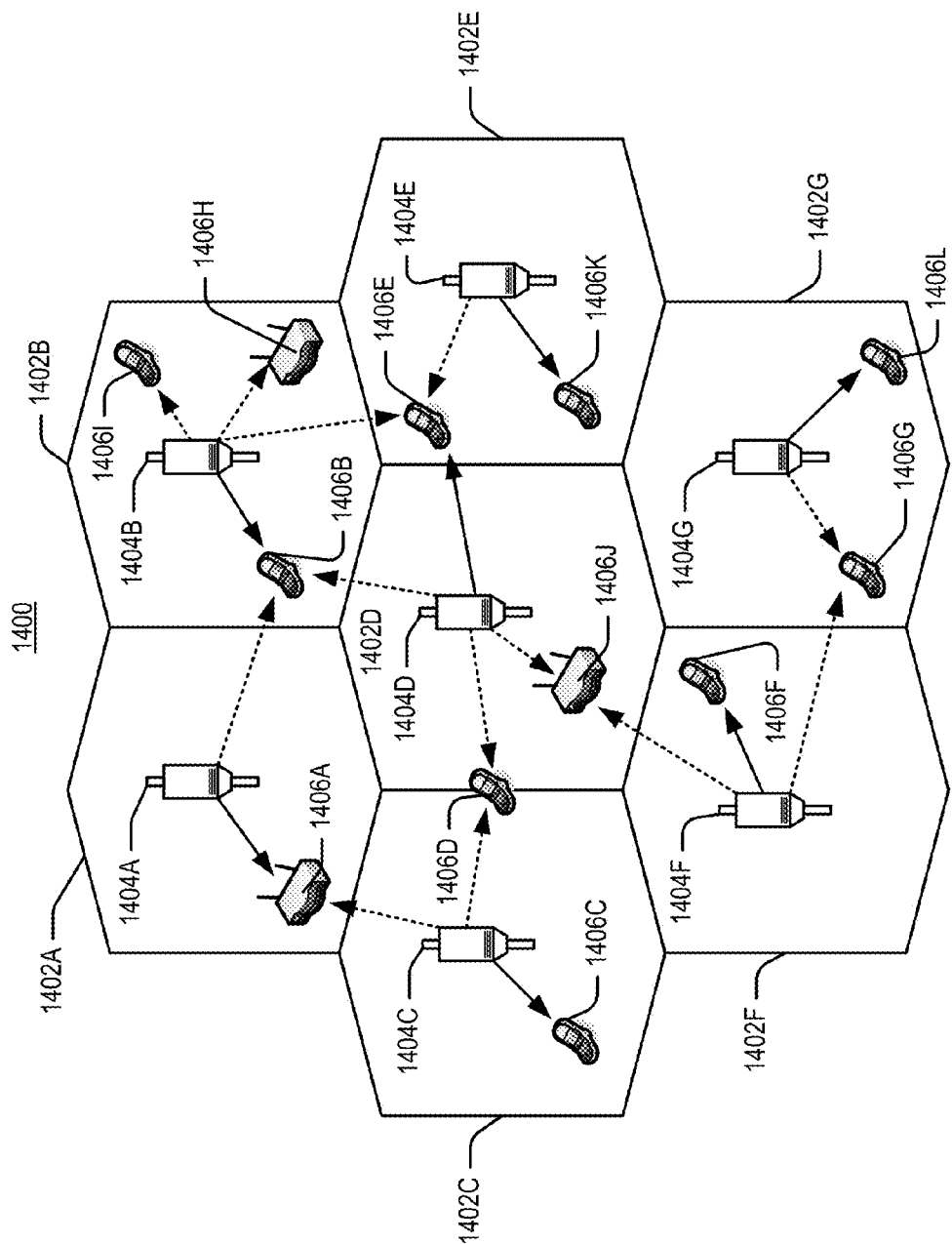
FIG. 14 is a simplified diagram of a wireless communication system.

FIG. 14 illustrates a wireless communication system 1400, configured to support a number of users, in which the teachings herein may be implemented. The system 1400 provides communication for multiple cells 1402, such as, for example, macro cells 1402A-1402G, with each cell being serviced by a corresponding access point 1404 (e.g., access points 1404A-1404G). As shown in FIG. 14, access terminals 1406 (e.g., access terminals 1406A-1406L) may be dispersed at various locations throughout the system over time. Each access terminal 1406 may communicate with one or more access points 1404 on a forward link (FL) and/or a reverse link (RL) at a given moment, depending upon whether the access terminal 1406 is active and whether it is in soft handoff, for example. The wireless communication system 1400 may provide service over a large geographic region. For example, macro cells 1402A-1402G may cover a few blocks in a neighborhood or several miles in a rural environment.

Figure 15:
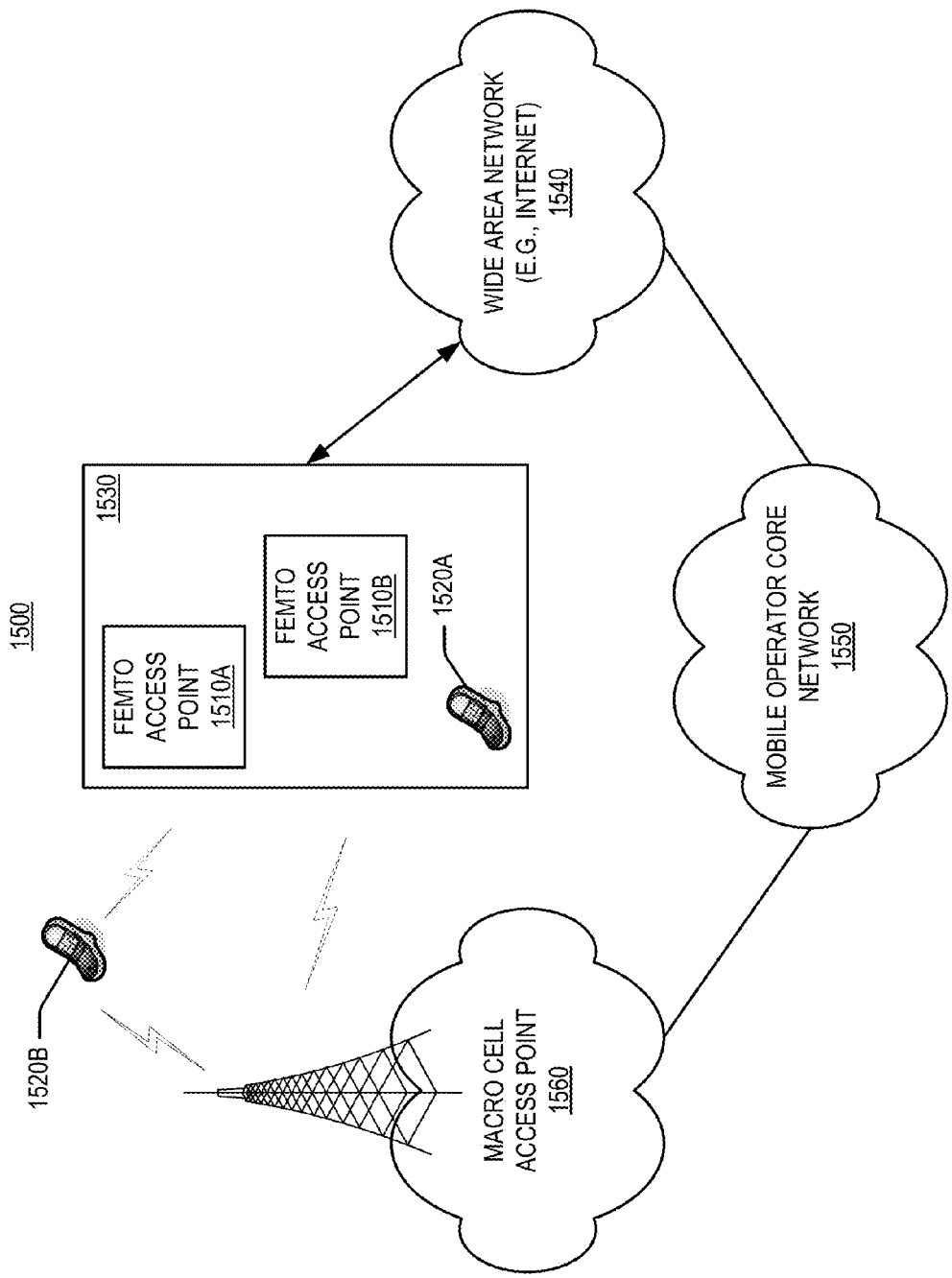
FIG. 15 is a simplified diagram of a wireless communication system including femto nodes.

FIG. 15 illustrates an exemplary communication system 1500 where one or more femto access points are deployed within a network environment. Specifically, the system 1500 includes multiple femto access points 1510 (e.g., femto access points 1510A and 1510B) installed in a relatively small scale network environment (e.g., in one or more user residences 1530). Each femto access point 1510 may be coupled to a wide area network 1540 (e.g., the Internet) and a mobile operator core network 1550 via a DSL router, a cable modem, a wireless link, or other connectivity means (not shown). As will be discussed below, each femto access point 1510 may be configured to serve associated access terminals 1520 (e.g., access terminal 1520A) and, optionally, other (e.g., hybrid or alien) access terminals 1520 (e.g., access terminal 1520B). In other words, access to femto access points 1510 may be restricted whereby a given access terminal 1520 may be served by a set of designated (e.g., home) femto access point(s) 1510 but may not be served by any non-designated femto access points 1510 (e.g., a neighbor's femto access point 1510).

Figure 16:
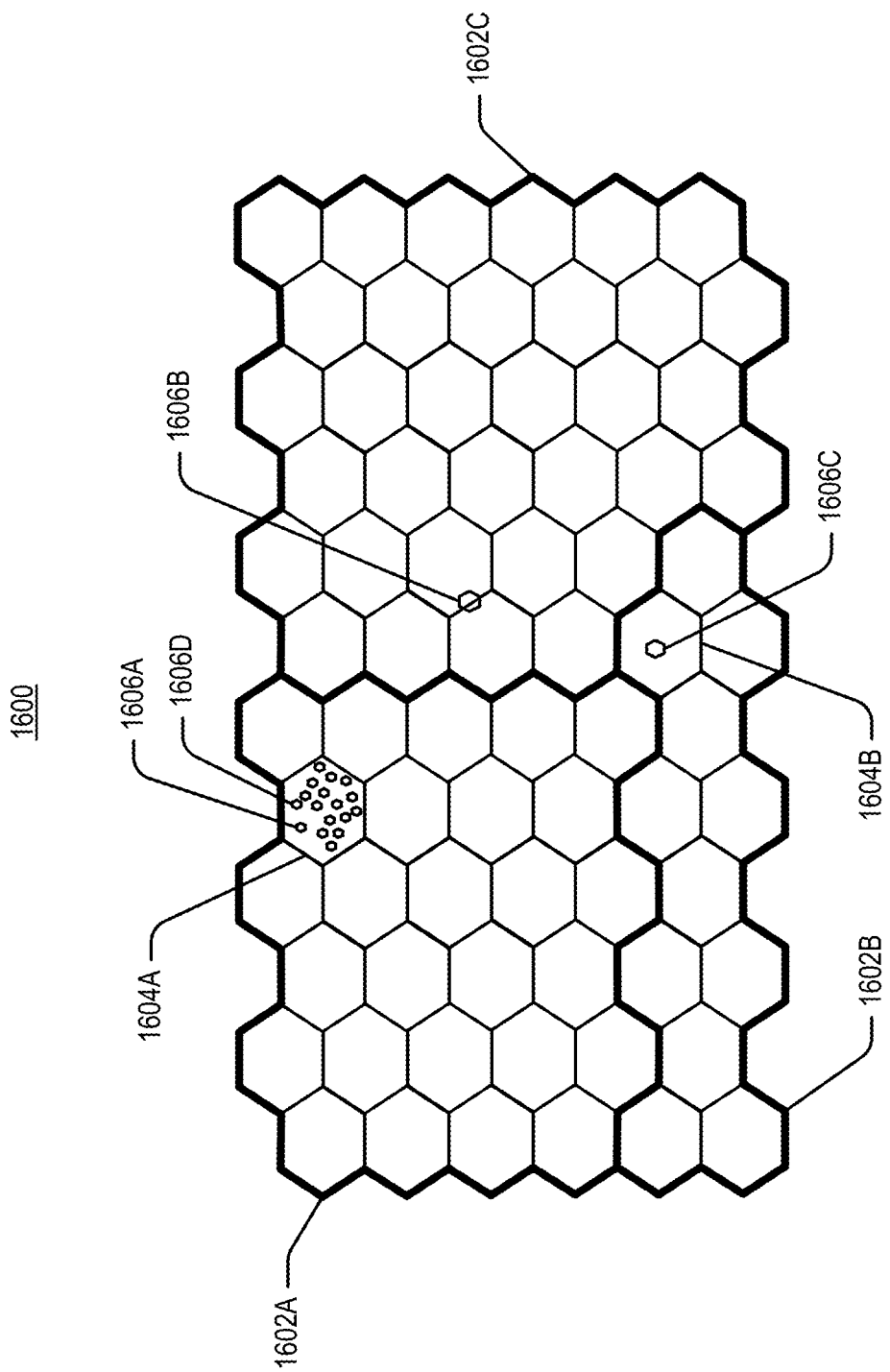
FIG. 16 is a simplified diagram illustrating coverage areas for wireless communication.

FIG. 16 illustrates an example of a coverage map 1600 where several tracking areas 1602 (or routing areas or location areas) are defined, each of which includes several macro coverage areas 1604. Here, areas of coverage associated with tracking areas 1602A, 1602B, and 1602C are delineated by the wide lines and the macro coverage areas 1604 are represented by the larger hexagons. The tracking areas 1602 also include femto coverage areas 1606. In this example, each of the femto coverage areas 1606 (e.g., femto coverage areas 1606B and 1606C) is depicted within one or more macro coverage areas 1604 (e.g., macro coverage areas 1604A and 1604B). It should be appreciated, however, that some or all of a femto coverage area 1606 may not lie within a macro coverage area 1604. In practice, a large number of femto coverage areas 1606 (e.g., femto coverage areas 1606A and 1606D) may be defined within a given tracking area 1602 or macro coverage area 1604. Also, one or more pico coverage areas (not shown) may be defined within a given tracking area 1602 or macro coverage area 1604.

Referring again to FIG. 15, the owner of a femto access point 1510 may subscribe to mobile service, such as, for example, 3G mobile service, offered through the mobile operator core network 1550. In addition, an access terminal 1520 may be capable of operating both in macro environments and in smaller scale (e.g., residential) network environments. In other words, depending on the current location of the access terminal 1520, the access terminal 1520 may be served by a macro cell access point 1560 associated with the mobile operator core network 1550 or by any one of a set of femto access points 1510 (e.g., the femto access points 1510A and 1510B that reside within a corresponding user residence 1530). For example, when a subscriber is outside his home, he is served by a standard macro access point (e.g., access point 1560) and when the subscriber is at home, he is served by a femto access point (e.g., access point 1510A). Here, a femto access point 1510 may be backward compatible with legacy access terminals 1520.

A femto access point 1510 may be deployed on a single frequency or, in the alternative, on multiple frequencies. Depending on the particular configuration, the single frequency or one or more of the multiple frequencies may overlap with one or more frequencies used by a macro access point (e.g., access point 1560).

In some aspects, an access terminal 1520 may be configured to connect to a preferred femto access point (e.g., the home femto access point of the access terminal 1520) whenever such connectivity is possible. For example, whenever the access terminal 1520A is within the user's residence 1530, it may be desired that the access terminal 1520A communicate only with the home femto access point 1510A or 1510B.

In some aspects, if the access terminal 1520 operates within the macro cellular network 1550 but is not residing on its most preferred network (e.g., as defined in a preferred roaming list), the access terminal 1520 may continue to search for the most preferred network (e.g., the preferred femto access point 1510) using a better system reselection (BSR) procedure, which may involve a periodic scanning of available systems to determine whether better systems are currently available and subsequently acquire such preferred systems. The access terminal 1520 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1510, the access terminal 1520 selects the femto access point 1510 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1510 that reside within the corresponding user residence 1530). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 17:
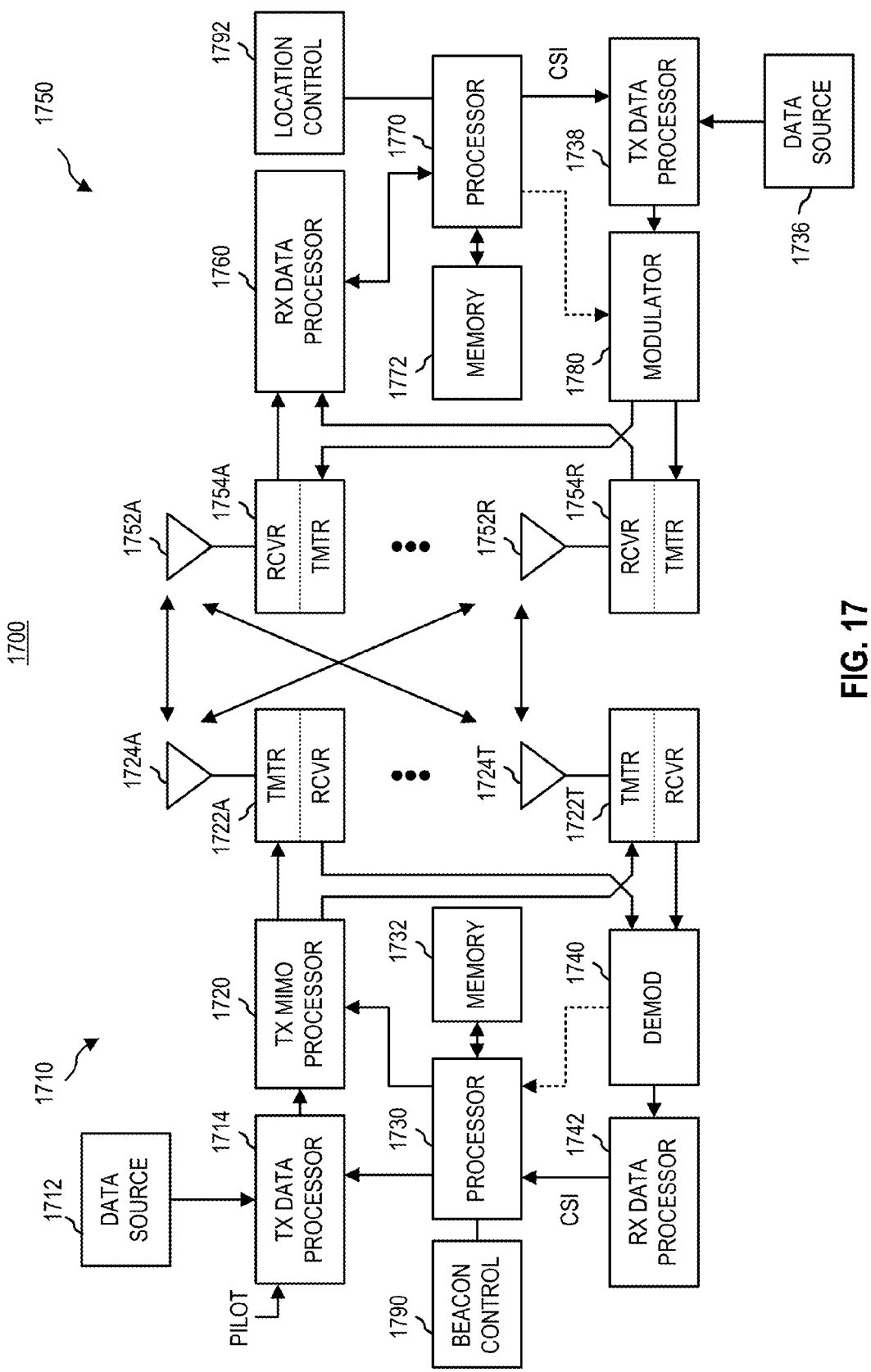
FIG. 17 is a simplified block diagram of several sample aspects of communication components.

FIG. 17 illustrates a wireless device 1710 (e.g., an access point) and a wireless device 1750 (e.g., an access terminal) of a sample MIMO system 1700. At the device 1710, traffic data for a number of data streams is provided from a data source 1712 to a transmit (TX) data processor 1714. Each data stream may then be transmitted over a respective transmit antenna.

The TX data processor 1714 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1730. A data memory 1732 may store program code, data, and other information used by the processor 1730 or other components of the device 1710.

The modulation symbols for all data streams are then provided to a TX MIMO processor 1720, which may further process the modulation symbols (e.g., for OFDM). The TX MIMO processor 1720 then provides $N_T$ modulation symbol streams to $N_T$ transceivers (XCVR) 1722A through 1722T. In some aspects, the TX MIMO processor 1720 applies beam-forming weights to the symbols of the data streams and to the antenna from which the symbol is being transmitted.

Each transceiver 1722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1722A through 1722T are then transmitted from $N_T$ antennas 1724A through 1724T, respectively.

At the device 1750, the transmitted modulated signals are received by $N_R$ antennas 1752A through 1752R and the received signal from each antenna 1752 is provided to a respective transceiver (XCVR) 1754A through 1754R. Each transceiver 1754 conditions (e.g., filters, amplifies, and downconverts) a respective received signal, digitizes the conditioned signal to provide samples, and further processes the samples to provide a corresponding "received" symbol stream.

A receive (RX) data processor 1760 then receives and processes the $N_R$ received symbol streams from $N_R$ transceivers 1754 based on a particular receiver processing technique to provide $N_T$ "detected" symbol streams. The RX data processor 1760 then demodulates, deinterleaves, and decodes each detected symbol stream to recover the traffic data for the data stream. The processing by the RX data processor 1760 is complementary to that performed by the TX MIMO processor 1720 and the TX data processor 1714 at the device 1710.

A processor 1770 periodically determines which precoding matrix to use (discussed below). The processor 1770 formulates a reverse link message comprising a matrix index portion and a rank value portion. A data memory 1772 may store program code, data, and other information used by the processor 1770 or other components of the device 1750.

The reverse link message may comprise various types of information regarding the communication link and/or the received data stream. The reverse link message is then processed by a TX data processor 1738, which also receives traffic data for a number of data streams from a data source 1736, modulated by a modulator 1780, conditioned by the transceivers 1754A through 1754R, and transmitted back to the device 1710.

At the device 1710, the modulated signals from the device 1750 are received by the antennas 1724, conditioned by the transceivers 1722, demodulated by a demodulator (DEMOD) 1740, and processed by a RX data processor 1742 to extract the reverse link message transmitted by the device 1750. The processor 1730 then determines which pre-coding matrix to use for determining the beam-forming weights then processes the extracted message.

FIG. 17 also illustrates that the communication components may include one or more components that perform beacon control or location control operations as taught herein. For example, a beacon control component 1790 may cooperate with the processor 1730 and/or other components of the device 1710 to send beacon signals to another device (e.g., device 1750) as taught herein. Similarly, a location control component 1792 may cooperate with the processor 1770 and/or other components of the device 1750 to receive beacon signals from another device (e.g., device 1710) in conjunction with determining the location of the device 1750. It should be appreciated that for each device 1710 and 1750 the functionality of two or more of the described components may be provided by a single component. For example, a single processing component may provide the functionality of the beacon control component 1790 and the processor 1730 and a single processing component may provide the functionality of the location control component 1792 and the processor 1770.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 18:
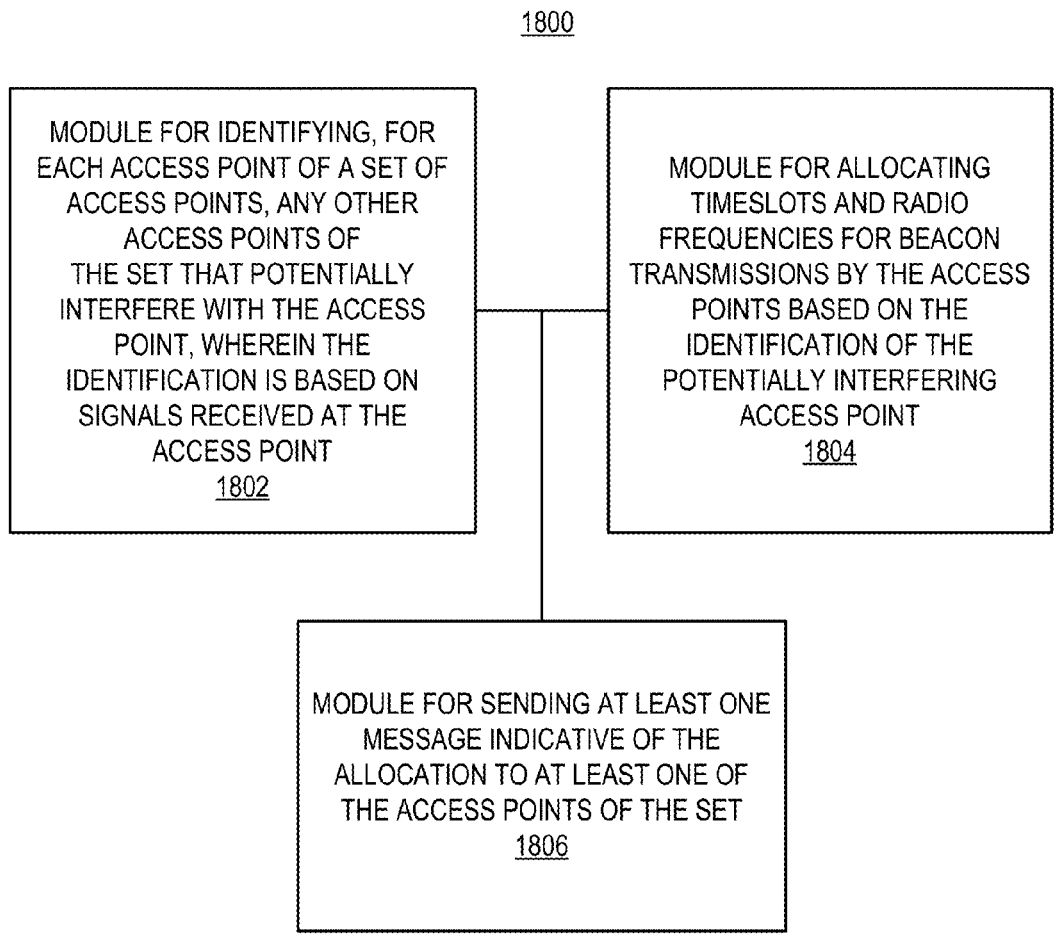
FIGS. 18 and 19 are simplified block diagrams of several sample aspects of apparatuses configured to support beacon allocation as taught herein.
Figure 19:
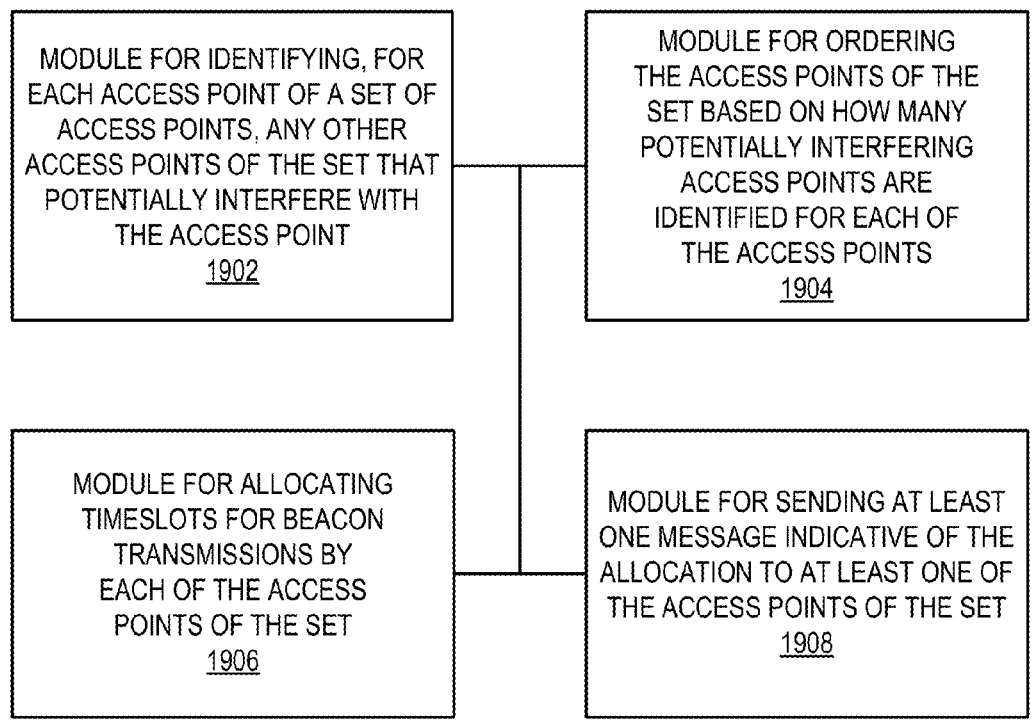

The functionality described herein (e.g., with regard to one or more of the accompanying figures) may correspond in some aspects to similarly designated "means for" functionality in the appended claims. Referring to FIGS. 18 and 19, apparatuses 1800 and 1900 are represented as a series of interrelated functional modules.

A module for identifying, for each access point of a set of access points, any other access points of the set that potentially interfere with the access point, wherein the identification is based on signals received at the access point 1802 may correspond at least in some aspects to, for example, a processing system as discussed herein. A module for allocating timeslots and radio frequencies for beacon transmissions by the access points of the set based on the identification of the potentially interfering access points 1804 may correspond at least in some aspects to, for example, a processing system as discussed herein. A module for sending at least one message indicative of the allocation to at least one of the access points of the set 1806 may correspond at least in some aspects to, for example, a communication component as discussed herein.

A module for identifying, for each access point of a set of access points, any other access points of the set that potentially interfere with the access point 1902 may correspond at least in some aspects to, for example, a processing system as discussed herein. A module for ordering the access points of the set based on how many potentially interfering access points are identified for each of the access points 1904 may correspond at least in some aspects to, for example, a processing system as discussed herein. A module for allocating timeslots for beacon transmissions by each of the access points of the set 1906 may correspond at least in some aspects to, for example, a processing system as discussed herein. A module for sending at least one message indicative of the allocation to at least one of the access points of the set 1908 may correspond at least in some aspects to, for example, a communication component as discussed herein.

The functionality of the modules of FIGS. 18-19 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. The functionality of these modules also may be implemented in some other manner as taught herein. In some aspects one or more of any dashed blocks in FIGS. 18-19 are optional.

In some aspects, an apparatus or any component of an apparatus may be configured to provide functionality as taught herein by, for example, manufacturing (e.g., fabricating) the apparatus or component so that it will provide the functionality, by programming the apparatus or component so that it will provide the functionality, or through the use of some other suitable configuring means.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage media, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for wireless communication, comprising:
a processing system configured to identify, for each access point of a set of access points, any other access points of the set that potentially interfere with the access point, wherein the identification is based on signals received at the access point, and wherein the processing system is further configured to allocate timeslots and radio frequencies for beacon transmissions by the access points of the set based on the identification of the potentially interfering access points; and
a communication component configured to send at least one message indicative of the allocation to at least one of the access points of the set.

2. The apparatus of claim 1, wherein the allocation of the timeslots comprises scheduling beacons that are detectable at at least one access terminal location for transmission during substantially contiguous timeslots.

3. The apparatus of claim 1, wherein the allocation of the radio frequencies comprises scheduling beacons that are identified as not being potentially interfering for transmission on a plurality of the radio frequencies during a common timeslot.

4. The apparatus of claim 1, wherein the allocation of the timeslots comprises:
determining that beacons initially allocated to different timeslots are detectable at at least one common location; and
reallocating the beacons initially allocated to the different timeslots to substantially contiguous timeslots based on the determination that the beacons are detectable.

5. The apparatus of claim 1, wherein the allocation of the timeslots comprises:
determining an initial allocation of the timeslots for the beacons;
determining, for each location of a plurality of locations, whether any of the initially allocated beacons are received during each of the timeslots;
determining, based on the determination of whether the initially allocated beacons are received at the locations during each of the timeslots, a likelihood of beacons being received from each unique pair of the timeslots at each of the locations; and
determining whether to schedule beacons on contiguous timeslots based on the likelihoods of beacons being received from the timeslot pairs at each of the locations.

6. The apparatus of claim 5, wherein the initial allocation of the timeslots comprises determining an initial beacon transmission schedule based on how many potentially interfering access points are identified for each of the access points, wherein any access points that potentially interfere with each other are scheduled on different timeslots.

7. The apparatus of claim 1, wherein the identification of the potentially interfering access points comprises conducting network listen measurements.

8. The apparatus of claim 1, wherein the allocation of the radio frequencies comprises allocating access points that are scheduled to transmit beacons on a common timeslot to different radio frequencies.

9. The apparatus of claim 1, wherein:
reselection beacons are scheduled for transmission on at least one of the radio frequencies; and
the allocation of the timeslots and radio frequencies comprises scheduling at least one of the beacons to be periodically transmitted instead of one of the reselection beacons on the at least one radio frequency.

10. The apparatus of claim 1, wherein the access points comprise femtocells.

11. A method for wireless communication, comprising:
identifying, for each access point of a set of access points, any other access points of the set that potentially interfere with the access point, wherein the identification is based on signals received at the access point;
allocating timeslots and radio frequencies for beacon transmissions by the access points of the set based on the identification of the potentially interfering access points; and
sending at least one message indicative of the allocation to at least one of the access points of the set.

12. The method of claim 11, wherein the allocation of the timeslots comprises scheduling beacons that are detectable at at least one access terminal location for transmission during substantially contiguous timeslots.

13. The method of claim 11, wherein the allocation of the radio frequencies comprises scheduling beacons that are identified as not being potentially interfering for transmission on a plurality of the radio frequencies during a common timeslot.

14. The method of claim 11, wherein the allocation of the timeslots comprises:
   determining that beacons initially allocated to different timeslots are detectable at at least one common location; and
   reallocating the beacons initially allocated to the different timeslots to substantially contiguous timeslots based on the determination that the beacons are detectable.

15. The method of claim 11, wherein the allocation of the timeslots comprises:
   determining an initial allocation of the timeslots for the beacons;
   determining, for each location of a plurality of locations, whether any of the initially allocated beacons are received during each of the timeslots;
   determining, based on the determination of whether the initially allocated beacons are received at the locations during each of the timeslots, a likelihood of beacons being received from each unique pair of the timeslots at each of the locations; and
   determining whether to schedule beacons on contiguous timeslots based on the likelihoods of beacons being received from the timeslot pairs at each of the locations.

16. The method of claim 15, wherein the initial allocation of the timeslots comprises determining an initial beacon transmission schedule based on how many potentially interfering access points are identified for each of the access points, wherein any access points that potentially interfere with each other are scheduled on different timeslots.

17. The method of claim 11, wherein the identification of the potentially interfering access points comprises conducting network listen measurements.

18. The method of claim 11, wherein the allocation of the radio frequencies comprises allocating access points that are scheduled to transmit beacons on a common timeslot to different radio frequencies.

19. The method of claim 11, wherein:
   reselection beacons are scheduled for transmission on at least one of the radio frequencies; and
   the allocation of the timeslots and radio frequencies comprises scheduling at least one of the beacons to be periodically transmitted instead of one of the reselection beacons on the at least one radio frequency.

20. The method of claim 11, wherein the access points comprise femtocells.

21. An apparatus for wireless communication, comprising:
   means for identifying, for each access point of a set of access points, any other access points of the set that potentially interfere with the access point, wherein the identification is based on signals received at the access point;
   means for allocating timeslots and radio frequencies for beacon transmissions by the access points of the set based on the identification of the potentially interfering access points; and
   means for sending at least one message indicative of the allocation to at least one of the access points of the set.

22. The apparatus of claim 21, wherein the allocation of the timeslots comprises scheduling beacons that are detectable at at least one access terminal location for transmission during substantially contiguous timeslots.

23. The apparatus of claim 21, wherein the allocation of the radio frequencies comprises scheduling beacons that are identified as not being potentially interfering for transmission on a plurality of the radio frequencies during a common timeslot.

24. The apparatus of claim 21, wherein the allocation of the timeslots comprises:
   determining that beacons initially allocated to different timeslots are detectable at at least one common location; and
   reallocating the beacons initially allocated to the different timeslots to substantially contiguous timeslots based on the determination that the beacons are detectable.

25. The apparatus of claim 21, wherein the allocation of the radio frequencies comprises allocating access points that are scheduled to transmit beacons on a common timeslot to different radio frequencies.

26. A computer-program product, comprising:
   a non-transitory computer-readable medium comprising code for causing a computer to:
   identify, for each access point of a set of access points, any other access points of the set that potentially interfere with the access point, wherein the identification is based on signals received at the access point;
   allocate timeslots and radio frequencies for beacon transmissions by the access points of the set based on the identification of the potentially interfering access points; and
   send at least one message indicative of the allocation to at least one of the access points of the set.

27. The computer-program product of claim 26, wherein the allocation of the timeslots comprises scheduling beacons that are detectable at at least one access terminal location for transmission during substantially contiguous timeslots.

28. The computer-program product of claim 26, wherein the allocation of the radio frequencies comprises scheduling beacons that are identified as not being potentially interfering for transmission on a plurality of the radio frequencies during a common timeslot.

29. The computer-program product of claim 26, wherein the allocation of the timeslots comprises:
   determining that beacons initially allocated to different timeslots are detectable at at least one common location; and
   reallocating the beacons initially allocated to the different timeslots to substantially contiguous timeslots based on the determination that the beacons are detectable.

30. The computer-program product of claim 26, wherein the allocation of the radio frequencies comprises allocating access points that are scheduled to transmit beacons on a common timeslot to different radio frequencies.

31. An apparatus for wireless communication, comprising:
   a processing system configured to:
   identify, for each access point of a set of access points, any other access points of the set that potentially interfere with the access point,
   order the access points of the set based on how many potentially interfering access points are identified for each of the access points, and
   allocate timeslots for beacon transmissions by each of the access points of the set, wherein the allocation is performed according to the ordering of the access points; and a communication component configured to send at least one message indicative of the allocation to at least one of the access points of the set.

32. The apparatus of claim 31, wherein the allocation of the timeslots comprises scheduling any access points that potentially interfere with each other on different timeslots.

33. The apparatus of claim 31, wherein the allocation of the timeslots comprises scheduling access points that do not potentially interfere with each other on a common timeslot.

34. The apparatus of claim 31, wherein the identification of the potentially interfering access points comprises conducting network listen measurements.

35. The apparatus of claim 31, wherein the identification of the potentially interfering access points comprises identifying subsets of neighboring access points.

36. The apparatus of claim 31, wherein the access points comprise femtocells.

37. A method for wireless communication, comprising:
  identifying, for each access point of a set of access points, any other access points of the set that potentially interfere with the access point;
  ordering the access points of the set based on how many potentially interfering access points are identified for each of the access points;
  allocating timeslots for beacon transmissions by each of the access points of the set, wherein the allocation is performed according to the ordering of the access points; and
  sending at least one message indicative of the allocation to at least one of the access points of the set.

38. The method of claim 37, wherein the allocation of the timeslots comprises scheduling any access points that potentially interfere with each other on different timeslots.

39. The method of claim 37, wherein the allocation of the timeslots comprises scheduling access points that do not potentially interfere with each other on a common timeslot.

40. The method of claim 37, wherein the identification of the potentially interfering access points comprises conducting network listen measurements.

41. The method of claim 37, wherein the identification of the potentially interfering access points comprises identifying subsets of neighboring access points.

42. The method of claim 37, wherein the access points comprise femtocells.

43. An apparatus for wireless communication, comprising:
  means for identifying, for each access point of a set of access points, any other access points of the set that potentially interfere with the access point;
  means for ordering the access points of the set based on how many potentially interfering access points are identified for each of the access points;
  means for allocating timeslots for beacon transmissions by each of the access points of the set, wherein the allocation is performed according to the ordering of the access points; and
  means for sending at least one message indicative of the allocation to at least one of the access points of the set.

44. The apparatus of claim 43, wherein the allocation of the timeslots comprises scheduling any access points that potentially interfere with each other on different timeslots.

45. The apparatus of claim 43, wherein the allocation of the timeslots comprises scheduling access points that do not potentially interfere with each other on a common timeslot.

46. The apparatus of claim 43, wherein the identification of the potentially interfering access points comprises conducting network listen measurements.

47. A computer-program product, comprising:
  a non-transitory computer-readable medium comprising code for causing a computer to:
  identify, for each access point of a set of access points, any other access points of the set that potentially interfere with the access point;
  order the access points of the set based on how many potentially interfering access points are identified for each of the access points;
  allocate timeslots for beacon transmissions by each of the access points of the set, wherein the allocation is performed according to the ordering of the access points; and
  send at least one message indicative of the allocation to at least one of the access points of the set.

48. The computer-program product of claim 47, wherein the allocation of the timeslots comprises scheduling any access points that potentially interfere with each other on different timeslots.

49. The computer-program product of claim 47, wherein the allocation of the timeslots comprises scheduling access points that do not potentially interfere with each other on a common timeslot.

50. The computer-program product of claim 47, wherein the identification of the potentially interfering access points comprises conducting network listen measurements.

* * * * *